(12) United States Patent
Kim

(10) Patent No.: US 9,110,566 B2
(45) Date of Patent: Aug. 18, 2015

(54) PORTABLE DEVICE AND METHOD FOR CONTROLLING USER INTERFACE IN PORTABLE DEVICE

(71) Applicant: LG ELECTRONICS INC., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 13/785,526

(22) Filed: Mar. 5, 2013

(65) Prior Publication Data

US 2014/0189551 A1 Jul. 3, 2014

(30) Foreign Application Priority Data

Dec. 31, 2012 (KR) .................. 10-2012-0158325

(51) Int. Cl.
*G06F 3/048* (2013.01)
*G06F 3/0482* (2013.01)
*G06F 3/0481* (2013.01)
*G06F 3/0483* (2013.01)

(52) U.S. Cl.
CPC .......... *G06F 3/0482* (2013.01); *G06F 3/04817* (2013.01); *G06F 3/0483* (2013.01)

(58) Field of Classification Search
CPC ... G06F 9/4443; G06F 3/0481; G06F 3/0482; G06F 3/04817; G06F 3/0483
See application file for complete search history.

(56) References Cited

U.S. PATENT DOCUMENTS

| | | | |
|---|---|---|---|
| 2009/0325686 A1* | 12/2009 | Davis et al. | 463/25 |
| 2010/0042535 A1* | 2/2010 | Stone | 705/39 |
| 2010/0090964 A1* | 4/2010 | Soo et al. | 345/173 |
| 2010/0107099 A1* | 4/2010 | Frazier et al. | 715/765 |
| 2011/0169749 A1 | 7/2011 | Ganey et al. | |
| 2011/0221776 A1* | 9/2011 | Shimotani et al. | 345/647 |
| 2012/0050007 A1 | 3/2012 | Forutanpour et al. | |
| 2012/0131508 A1* | 5/2012 | Lee | 715/835 |
| 2012/0147057 A1* | 6/2012 | Lee | 345/681 |
| 2013/0111395 A1* | 5/2013 | Ying et al. | 715/783 |
| 2013/0135234 A1* | 5/2013 | Hisano et al. | 345/173 |
| 2013/0307801 A1* | 11/2013 | Nam | 345/173 |
| 2014/0184519 A1* | 7/2014 | Benchenaa et al. | 345/173 |

* cited by examiner

*Primary Examiner* — Patrick Riegler
*Assistant Examiner* — Jian Yu
(74) *Attorney, Agent, or Firm* — Birch, Stewart, Kolasch & Birch, LLP

(57) ABSTRACT

A portable device and a method for controlling a user interface (UI) of the same are disclosed. The portable device includes a display unit including a touchscreen configured to display icons of a plurality of icon groups, a sensing unit for sensing a gesture input by a user, and a controller, if the sensed gesture is a gesture corresponding to an icon rearrangement command, configured to output the icon rearrangement command to the display unit in a manner that positions of icons of at least two icon groups of the plurality of icon groups move downward such that the icons are rearranged on the touchscreen.

26 Claims, 17 Drawing Sheets

LEFT SIDE VIEW    FRONT VIEW    RIGHT SIDE VIEW

LEFT SIDE VIEW   RIGHT SIDE VIEW

LEFT SIDE VIEW

PORTABLE DEVICE AND METHOD FOR CONTROLLING USER INTERFACE IN PORTABLE DEVICE

Pursuant to 35 U.S.C. §119(a), this application claims the benefit of Korean Patent Application No. 10-2012-0158325, filed on Dec. 31, 2012, which is hereby incorporated by reference as if fully set forth herein.

BACKGROUND OF THE INVENTION

1. Field of the Invention

The present disclosure relates to a portable device, and more particularly to a portable device capable of being manipulated with one hand, and a method for controlling a user interface (UI) for the same.

2. Discussion of the Related Art

Generally, a portable device includes a personal digital assistant (PDA), a portable media player (PMP), an e-book, a navigation system, an MP3 player, a smartphone, etc. Most portable devices are designed to select/execute various icons displayed on a screen using a variety of input units. For example, the input units may include mechanical touching activated by pressure applied to a keypad interworking with a dome switch of a circuit board, and screen touching activated by capacitance, electromagnetic induction, resistance film, near field imaging (NFI), ultrasonic waves, or infrared light.

Specifically, the user interface (UI) provided through the touchscreen displays a plurality of menus corresponding to a variety of functions on the touchscreen, and induces a user to touch any of specific-function icons such that the corresponding function can be activated.

In this case, since the portable device is designed to be properly held by a user hand, the user grasps the portable device using one hand and touches icons displayed on the screen of the portable device using a specific finger (e.g., a thumb) such that the user can select a function corresponding to the touched icon. In other words, the user moves the thumb to a desired icon displayed on the screen of the portable device so as to touch the icon, such that a function corresponding to the touched icon can be selected.

However, it may be impossible for the user to select all icons displayed on the screen using only a thumb of one hand grasping the portable device according to the size of the screen or a hand or thumb length. That is, the thumb does not contact some icons displayed on the screen, so that the user has difficulty in freely touching all icons displayed on the screen. In particular, the larger the screen size of the portable device (such as a smartphone), the greater is difficulty in touching icons using only one hand.

In this case, the user must select icons using a finger of the other hand. Otherwise, after the user must change a current position of the portable device to another position, the user must select the corresponding icon using a specific finger, resulting in greater inconvenience of use. Specifically, assuming that the user must manipulate the portable device using only one hand, user inconvenience greatly increases.

SUMMARY OF THE INVENTION

Accordingly, the present disclosure is directed to a portable device and a method for controlling a user interface of the portable device that substantially obviate one or more problems due to limitations and disadvantages of the related art.

An object of the present disclosure is to provide a portable device and a method for controlling a user interface (UI) of the same that enable a user to easily manipulate the portable device using only one hand.

Another object of the present disclosure is to provide a portable device and a method for controlling a user interface (UI) of the same, which rearrange icons on the screen of the portable device using a specific gesture of a user such that the user can easily manipulate the portable device using only one hand.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a portable device includes: a display unit including a touchscreen configured to display icons of a plurality of icon groups; a sensing unit configured to sense a gesture input by a user, and a controller, if the sensed gesture is a gesture corresponding to an icon rearrangement command, configured to control the display unit to move positions of icons of at least two icon groups of the plurality of icon groups downward, thereby rearranging the icons on the touchscreen. Herein, the touchscreen, where the icons of the at least two icon groups are rearranged, is classified into a first region and a second region, a size of each icon contained in the first region is smaller than a size of each icon contained in the second region, and the number of icons displayed on the touchscreen before the icon rearrangement is identical to the number of icons displayed on the touchscreen after the icon rearrangement.

The display unit provides a user interface for enabling the touchscreen to be folded at a position between the at least two icon groups, positions of icons of two or more icon groups among the plurality of icon groups move downward in response to a folded touchscreen shape, thereby rearranging the icons on the touchscreen.

A movement distance of the icons of the at least two or more icon groups is changed in proportion to at least one of a reduced length caused by a folded state of the touchscreen and a folded angle of the touchscreen.

The first region includes a folded region of the touchscreen, and the second region includes an unfolded region of the touchscreen.

The controller measures a variation in height of the user finger that has been used for the gesture such that the controller determines whether the sensed gesture is a gesture corresponding to the icon rearrangement command.

The controller measures a variation in shape of the user finger that has been used for the gesture such that the controller determines whether the sensed gesture is a gesture corresponding to the icon rearrangement command.

The controller, if the user finger that has been used for the gesture exceeds a predetermined reference line on the touchscreen, finally determines the sensed gesture to be a gesture corresponding to an icon rearrangement command.

If the user grasping the portable device with one hand inputs a gesture corresponding to the icon rearrangement command using a finger of the hand, the controller finally determines the sensed gesture to be a gesture corresponding to the icon rearrangement command.

If one of icons displayed on the folded touchscreen is selected by the user and a function associated with the selected icon is performed, the controller controls the display unit to restore the folded touchscreen and the rearranged icons to their original states.

If the sensed gesture is a gesture corresponding to an icon rearrangement release command, the controller controls the display unit to restore the folded touchscreen and the rearranged icons to their original states.

If a gesture sensed at the folded touchscreen is a gesture corresponding to an icon rearrangement command, the controller controls the display unit to provide a user interface (UI) for enabling the touchscreen to be folded at a position between two different icon groups among the plurality of ion groups, and to move positions of icons of two or more icon groups among the plurality of icon groups downward in response to a folded touchscreen shape, thereby rearranging the icons on the touchscreen.

The display unit provides a user interface for allowing the at least one icon group to be faded away from the touchscreen, moves positions of icons of one or more icon groups among the plurality of icon groups downward in response to a faded touchscreen shape, thereby rearranging the icons on the touchscreen. The icons displayed at one row of the touchscreen are grouped into one icon group.

In another aspect of the present disclosure, a method for controlling a user interface of a portable device to rearrange a position of at least one icon on a touchscreen displaying icons of a plurality of icon groups includes sensing a gesture input by a user, and if the sensed gesture is a gesture corresponding to an icon rearrangement command, moving positions of icons of at least two icon groups among the plurality of icon groups downward, and rearranging the icons on the touchscreen, wherein the touchscreen, where the icons of the at least two icon groups are rearranged, is classified into a first region and a second region, a size of each icon contained in the first region is smaller than a size of each icon contained in the second region, and the number of icons displayed on the touchscreen before the icon rearrangement is identical to the number of icons displayed on the touchscreen after the icon rearrangement.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DESCRIPTION OF SPECIFIC EMBODIMENTS

Figure 1:
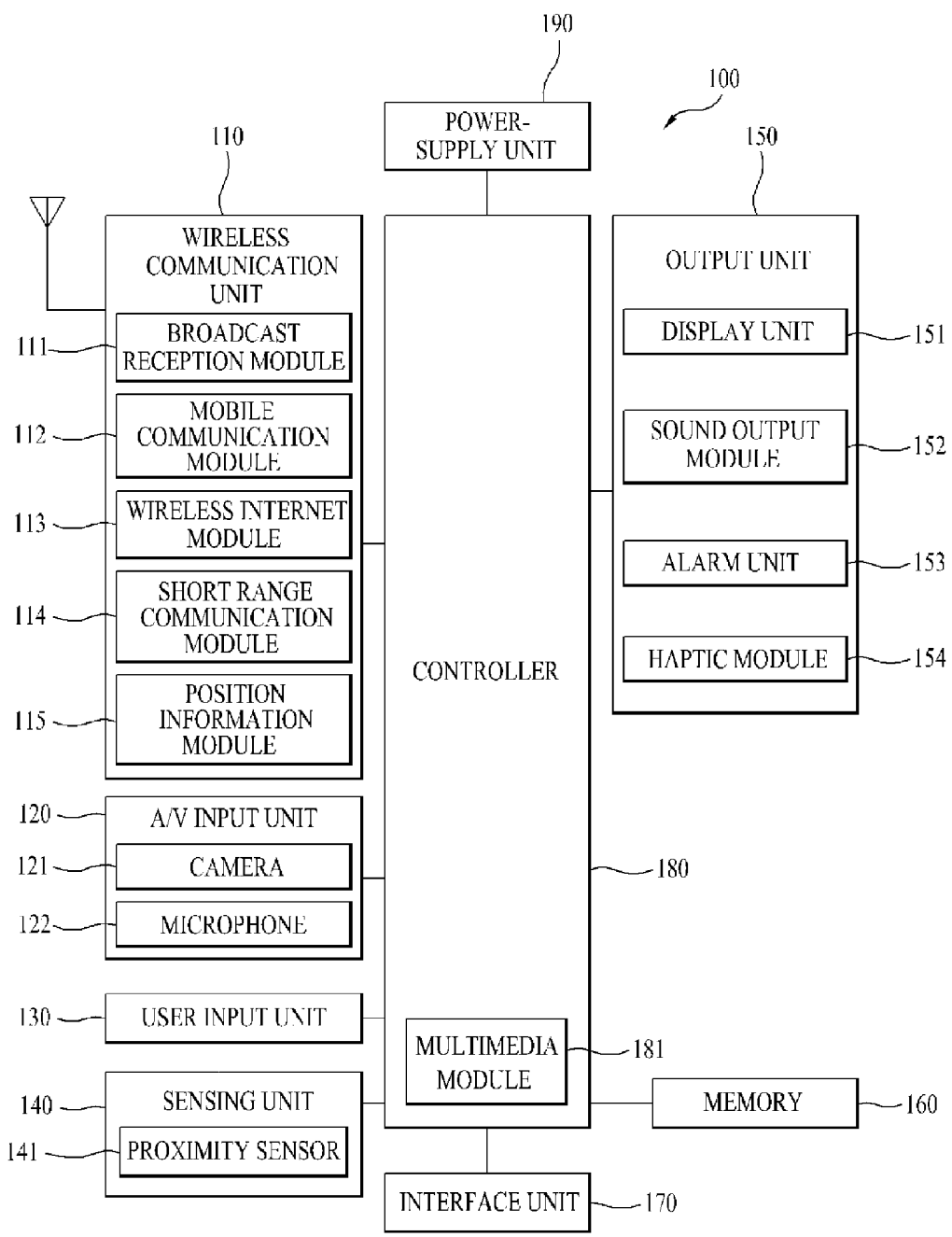
FIG. 1 is a block diagram illustrating constituent components of a smartphone among a plurality of portable devices according to an embodiment of the present disclosure.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

Prior to describing the present disclosure, it should be noted that most terms disclosed in the present disclosure are defined in consideration of functions of the present disclosure and correspond to general terms well known in the art, and can be differently determined according to intentions of those skilled in the art, usual practices, or introduction of new technologies. In some cases, a few terms have been selected by the applicant as necessary and will hereinafter be disclosed in the following description of the present disclosure. Therefore, it is preferable that the terms defined by the applicant be understood on the basis of their meanings in the present disclosure.

In association with the embodiments of the present disclosure, specific structural and functional descriptions are disclosed for illustrative purposes only and the embodiments of the present disclosure can be implemented in various ways without departing from the scope or spirit of the present disclosure.

While the present disclosure permits a variety of modifications and changes, specific embodiments of the present disclosure illustrated in the drawings will be described below in detail. However, the detailed description is not intended to limit the present disclosure to the described specific forms. Rather, the present disclosure includes all modifications, equivalents, and substitutions without departing from the spirit of the disclosure as defined in the claims.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

Throughout the specification, when a certain part "includes" a certain element, it means that the part can further include other elements not excluding the other elements. Furthermore, the terms "unit" and "part" mean units which process at least one function or operation, which can be implemented by hardware, software, or combination of hardware and software.

In accordance with the embodiments of the present disclosure, if the user inputs a touch gesture corresponding to an icon rearrangement command using his or her finger, a touchscreen including icons is folded horizontally in such a manner that the icons can be rearranged on the touchscreen in response to the folded shape. That is, if the touchscreen including icons is folded horizontally, icons contained in the folded part move downward and are simultaneously rearranged. In this case, location information of the corresponding icons is changed in response to movement of the icons.

In accordance with one embodiment of the present disclosure, if the user bends and stretches a finger on the touchscreen, i.e., if a stretching state of the user finger on the touchscreen is detected by the smartphone, the smartphone recognizes that this stretching action is a touch gesture corresponding to the icon rearrangement command.

The scope or spirit of the touch gesture corresponding to the icon rearrangement command is not limited only to the above-mentioned embodiment, and it should be noted that other touch gestures can also be applied to the present disclosure without difficulty. For example, if the user stretches and bends a finger (i.e., if the user hooks the finger), this hooking action of the user finger may be established as a touch gesture corresponding to the icon rearrangement command. The touch gesture corresponding to the icon rearrangement command can be easily modified by those skilled in the art and, as such, the scope or spirit of the present disclosure is not limited thereto.

The term "touch gesture" to be described in the following description is not conceptually limited to direct contact between a touchscreen and any one of a user body (e.g., a user finger) and an input unit (e.g., a stylus), and can also be applied to non-contact therebetween without departing from the scope or spirit of the present disclosure. In other words, the touch gesture described in the present disclosure may include all kinds of user gestures capable of being detected by the portable device when the user is in direct contact with the touchscreen or is in close vicinity to the touchscreen. In particular, if the user inputs a non-contact touch gesture to the touchscreen without directly touching the touchscreen, the non-contact touch gesture of the user will hereinafter be referred to as a hovering gesture in the following description.

If the user inputs the touch gesture to the touchscreen using his or her finger, at least one of a variation of the finger height and a variation of the finger shape is checked to determine the presence or absence of an icon rearrangement command. If the icon rearrangement command is determined, the touchscreen shape is folded horizontally and some icons displayed on the touchscreen are stretched down so that all icons displayed on the touchscreen can be rearranged.

Although the present disclosure will disclose various embodiments using the smartphone among various portable devices for convenience of description, it should be noted that the scope or spirit of the present disclosure is not limited thereto. In other words, the present disclosure can be applied to all kinds of portable devices including the smartphone.

FIG. 1 is a block diagram illustrating constituent components of a smartphone among a plurality of portable devices according to an embodiment of the present disclosure.

Referring to FIG. 1, the smartphone 100 may include a wireless communication unit 110, an A/V (Audio/Video) input unit 120, a user input unit 130, a sensing unit 140, an output unit 150, a memory 160, an interface unit 170, a controller 180, a power supply unit 190, etc. FIG. 1 illustrates the smartphone 100 having various components, but it is understood that implementing all of the illustrated components is not a requirement. The smartphone 100 may be implemented by greater or fewer components.

The wireless communication unit 110 includes one or more components allowing radio frequency (RF) communication between the smartphone 100 and a wireless communication system or a network in which the smartphone 100 is located. For example, the wireless communication unit 110 may include a broadcast receiving module 111, a mobile communication module 112, a wireless Internet module 113, a short-range communication module 114, and a position information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server (or a broadcast station) that generates and transmits a broadcast signal and/or broadcast associated information, or a server (or a broadcast station) that receives a previously generated broadcast signal and/or broadcast associated information and transmits the same to the smartphone. The broadcast signal may include a TV broadcast signal, a radio broadcast signal, a data broadcast signal, and the like. Also, the TV broadcast signal may further include a broadcast signal formed by combining the data broadcast signal with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive digital broadcast signals using various types of digital broadcast systems, for example, digital multimedia broadcasting-terrestrial (DMB-T), digital multimedia broadcasting-satellite (DMB-S), MediaFLO (Media Forward Link Only), digital video broadcast-handheld (DVB-H), integrated services digital broadcast-terrestrial (ISDB-T), mobile and handheld (MH), next generation handheld (NGH), etc. Of course, the broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and receives radio frequency (RF) signals to and from at least one of a base station (BS), an external terminal and a server. Such RF signals may include a voice call signal, a video call signal or various types of data according to text and/or multimedia message transmission and/or reception.

The wireless Internet module 113 supports wireless Internet access for the smartphone 100. This module may be internally or externally coupled to the smartphone 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module supporting short-range communication. Some examples of short-range communication technology include Bluetooth, Radio Frequency IDentification (RFID), Infrared Data Association (IrDA), Ultra-WideBand (UWB), ZigBee, and the like.

The position information module 115 is a module for checking or acquiring a position (or location) of the smartphone. For example, the position information module 115 may include a GPS (Global Positioning System) module that receives position information from a plurality of satellites.

The A/V input unit 120 is used to input an audio signal or a video signal and may include a camera module 121, a microphone 122, and the like. The camera module 121 processes an image frame of a still image or a moving image acquired through an image sensor in a video communication mode or an image capture mode. The processed image frame may be displayed on a display unit 151.

The image frame processed by the camera 121 may also be stored in the memory 160 or may be transmitted to the outside through the wireless communication unit 110. The camera 121 may include two or more camera modules 121 depending on use environments.

The microphone 122 receives an external sound signal through a microphone and processes it into electrical audio data in a phone call mode or an audio recording mode, or a voice recognition mode. In the phone call mode, the processed audio data may be converted into a format transmittable to a base station (BS) through the mobile communication module 112. The microphone 122 may implement a variety of noise removal algorithms for removing noise occurring when receiving external sound signals.

The user input unit 130 generates key input data corresponding to key strokes that the user has entered for controlling the operation of the smartphone. The user input unit 130 may include a keypad, a dome switch, a touchpad (including a static-pressure type and an electrostatic type), a jog wheel, a jog switch, and the like.

The user input unit 130 includes a sensor (hereinafter referred to as a touch sensor) for sensing a touch gesture, and may be implemented as a touchscreen layered with the display unit 151. That is, the user input unit 130 may be integrated with the display unit 151 into one module. The touch sensor may be configured in the form of a touch film, a touch sheet, or a touchpad, for example.

The touch sensor may convert a variation in pressure, applied to a specific portion of the display unit 151, or a variation in capacitance, generated at a specific portion of the display unit 151, into an electric input signal. The touch sensor may sense pressure, position, and an area (or size) of the touch.

When the user applies a touch input to the touch sensor, a signal corresponding to the touch input may be transmitted to a touch controller (not shown). The touch controller may then process the signal and transmit data corresponding to the processed signal to the controller 180. Accordingly, the controller 180 may detect a touched portion of the display unit 151.

The user input unit 130 is designed to detect at least one of a user's finger and a stylus pen. The controller 180 can recognize at least one of the position, shape and size of the touched region according to the sensing result of the touch sensor contained in the user input unit 130.

The sensing unit 140 detects a current state of the smartphone 100 such as an open/closed state of the smartphone 100, location of the smartphone 100, acceleration or deceleration of the smartphone 100, and generates a sensing signal for controlling the operation of the smartphone 100. The sensing unit 140 also provides sensing functions associated with detection of whether or not the power-supply unit 190 supplies power or whether or not the interface unit 170 has been coupled with an external device. Meanwhile, the sensing unit 140 may include a proximity sensor 141. The sensing unit 140 may include a gyroscope sensor, an acceleration sensor, a geomagnetic sensor, etc.

The output unit 150 is provided to output an audio signal, a video signal, or a tactile signal and may include the display unit 151, a sound output module 152, an alarm unit 153, a haptic module 154, and the like.

The display unit 151 displays (outputs) information processed by the smartphone 100. For example, when the smartphone 100 is in a phone call mode, the display unit 151 may display a User Interface (UI) or a Graphical User Interface (GUI) associated with a call or other communication. When the smartphone 100 is in a video call mode or image capture mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some parts of the display unit 151 may be turned on or off. In more detail, the display unit 151 can be switched on or off in units of LEDs, and LEDs associated with a predetermined screen region can be switched on or off. In this case, the LEDs associated with the predetermined screen region may be LEDs for illuminating a light beam to the predetermined screen region or may be LEDs located at positions associated with the predetermined screen region. For example, the LEDs may be OLEDs. In addition, lighting of the screen region may indicate lighting of LEDs associated with the corresponding screen region, and brightness adjusting of the screen region may indicate brightness of LEDs associated with the corresponding screen region.

Power can be supplied to LEDs of the display unit 151 on the basis of the LEDs, or the amount of power supply of the display unit 151 is adjusted in units of LEDs, such that the LEDs can be turned on or off and brightness of the LEDs can be adjusted.

Some of these displays may be configured into a transparent type or light transmission type displays, through which the outside can be seen. These displays may be referred to as transparent displays. A representative of the transparent displays is a transparent OLED (TOLED). The rear structure of the display unit 151 may also be configured into a light transmission type structure. In this structure, it is possible for a user to view objects located at the rear of the smartphone body through a region occupied by the display unit 151 of the smartphone body.

Two or more display units 151 may be provided depending on how the smartphone 100 is realized. For example, the smartphone 100 may include both an external display unit (not shown) and an internal display unit (not shown). For example, a plurality of display units may be spaced apart from one surface of the smartphone 100 or be integrated in one. In addition, the display units may also be arranged at different surfaces, respectively.

If the display unit 151 and a sensor for sensing a touching action (hereinafter referred to as a touch sensor) are configured in the form of a layer, namely, if the display unit 151 and the touch sensor are configured in the form of a touchscreen, the display unit 151 may also be used as an input unit in addition to being used as the output unit. The touchscreen may be contained in the display unit 151, and the touch sensor may be contained in the user input unit 130.

A proximity sensor 141 may be disposed at an inner region of the smartphone 100 surrounded by the touchscreen or in the vicinity of the touchscreen. The proximity sensor 141 is a sensor to sense whether an object has approached a predetermined sensing surface or is present in the vicinity of the predetermined sensing surface using electromagnetic force or infrared rays without mechanical contact. The proximity sensor 141 has longer lifespan and higher applicability than a contact type sensor.

Examples of the proximity sensor 141 may include a transmission type photoelectric sensor, direct reflection type photoelectric sensor, mirror reflection type photoelectric sensor, high frequency oscillation type proximity sensor, capacitive type proximity sensor, magnetic type proximity sensor and infrared proximity sensor. In a case in which the touchscreen is of an electrostatic type, the touchscreen is configured to sense approach of a pointer based on change of an electric field caused by the approach of the pointer. In this case, the touchscreen (touch sensor) may be classified as a proximity sensor. In the following description, a physical unit (such as a user's finger or stylus pen) capable of performing touch, proximity touch, touch gesture, etc. will hereinafter be collectively referred to as a "pointer".

In the following description, an action in which a pointer approaches the touchscreen without contact and it is recognized that the pointer is located on the touchscreen is referred to as "proximity touch", and an action in which a pointer directly contacts the touchscreen is referred to as "contact touch" for convenience of description. A position at which proximity touch of the pointer is performed on the touchscreen is a position at which the pointer corresponds perpendicularly to the touchscreen when the proximity touch of the pointer is performed.

The proximity sensor 141 senses a proximity touch operation and proximity touch patterns (for example, a proximity touch distance, a proximity touch direction, proximity touch velocity, a proximity touch time, a proximity touch position, proximity touch movement, etc.) Information corresponding to the sensed proximity touch operation and proximity touch patterns may be output on the touchscreen.

The sound output module 152 may output audio data which has been received from the wireless communication unit 110 or has been stored in the memory 160 during a call signal reception mode, a call connection mode, a recording mode, a voice recognition mode, a broadcast reception mode, and the like. The sound output module 152 may output sound signals related to functions (e.g., call signal reception sound, message reception sound, etc.) carried out in the smartphone 100. The sound output module 152 may include a receiver, a speaker, a buzzer, and the like.

The alarm unit 153 outputs a signal notifying the user that an event has occurred in the smartphone 100. Examples of the event occurring in the smartphone 100 include incoming call reception, message reception, key signal input, touch input, etc. The alarm unit 153 outputs a signal notifying the user of the occurrence of an event in a different form from an audio signal or a video signal. For example, the alarm unit 153 may output a notification signal through vibration. The video signal or the audio signal may be output through the sound output module 152, so that the display unit 151 and the sound output module 152 may be classified as some parts of the alarm unit 153.

The haptic module 154 generates a variety of tactile effects which the user can sense. One typical example of the tactile effects that can be generated by the haptic module 154 is vibration. In a case where the haptic module 154 generates vibration as a tactile effect, the haptic module 154 may change intensity and pattern of generated vibration. For example, the haptic module 154 may combine different vibrations and output the combined vibration, or may sequentially output different vibrations.

In addition to vibration, the haptic module 154 may generate various tactile effects, such as a stimulus effect by an arrangement of pins that move perpendicularly to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element.

The haptic module 154 may be implemented so as to allow the user to perceive such effects not only through direct tactile sensation but also through kinesthetic sensation of fingers, arms, or the like of the user. Two or more haptic modules 154 may be provided depending on how the smartphone 100 is constructed.

The memory 160 may store a program for operating the controller 180, and may temporarily store I/O data (for example, a phonebook, a message, a still image, a moving image, etc.). The memory 160 may store vibration and sound data of various patterns that are output when a user touches the touchscreen.

The memory 160 may include a storage medium of at least one type of a flash memory, a hard disk, a multimedia card micro type, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc. Also, the smartphone 100 may utilize web storage that performs a storage function of the memory 160 over the Internet.

The interface unit 170 may be used as a path via which the smartphone 100 is connected to all external devices. The interface unit 170 receives data from the external devices, or receives a power-supply signal from the external devices, such that it transmits the received data and the power-supply signal to each constituent element contained in the smartphone 100, or transmits data stored in the smartphone 100 to the external devices. For example, the interface unit 170 may include a wired/wireless headset port, an external charger port, a wired/wireless data port, a memory card port, a port connected to a device including an identification module, an audio I/O port, a video I/O port, an earphone port, and the like.

An identification module is a chip that stores a variety of information for identifying the authority to use the smartphone 100, and may include a user identity module (UIM), a subscriber identity module (SIM), a universal scriber identity module (USIM), and the like. A device including an identification (ID) module (hereinafter referred to as an identification device) may be configured in the form of a smart card. Therefore, the ID device may be coupled to the smartphone 100 through a port.

When the smartphone 100 is connected to an external cradle, the interface unit 170 may be used as a path through which the connected cradle supplies power to the smartphone 100 or a path through which a variety of command signals input to the cradle by a user are transferred to the smartphone 100. The various command signals or the power input from the cradle may function as a signal for enabling the user to perceive that the mobile terminal is correctly mounted in the cradle.

The controller 180 generally controls the overall operation of the smartphone 100. For example, the controller 180 performs control and processing associated with voice communication, data communication, video communication, and the like. The controller 180 may include a multimedia module 181 for multimedia reproduction. The multimedia module 181 may be installed at the interior or exterior of the controller 180.

The controller 180 may sense a user action and control the smartphone 100 based on the sensed user action. The user action may include selection of a physical button of a display or a remote controller, implementation of a prescribed touch gesture or selection of a soft button on a touchscreen display, implementation of a prescribed spatial gesture recognized from an image captured from a capture device, and implementation of prescribed speaking recognized through voice recognition with respect to a voice signal received by the microphone 122. The controller 180 may interpret the user action as at least one implementable command. The controller 180 may control the components of the electronic device 400 in response to the at least one interpreted command. That is, the controller 180 may control input and output between the components of the smartphone 100 and reception and processing of data, using the at least one command.

The controller 180 can perform pattern recognition processing so as to recognize handwriting input or drawing input performed on the touchscreen as text and images.

The power supply unit 190 serves to supply power to each component by receiving external power or internal power under control of the controller 180.

A variety of embodiments to be disclosed in the following description may be implemented in a computer or a computer-readable recording medium by means of software, hardware, or a combination thereof.

In the case of implementing the present disclosure by hardware, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for implementing other functions, etc. In some cases, embodiments of the present disclosure may also be implemented as the controller 180.

In the case of implementing the present disclosure by software, embodiments such as steps and functions to be disclosed in the present disclosure can be implemented by additional software modules. Each software module may perform one or more functions and operations to be disclosed in the present disclosure. Software code can be implemented as a software application written in suitable program languages. The software code may be stored in the memory 160, and may be carried out by the controller 180.

If the user inputs a touch gesture corresponding to an icon rearrangement command using his or her finger on the smartphone of FIG. 1, a touchscreen including icons is folded horizontally in such a manner that the icons can be rearranged on the touchscreen in response to the folded shape. That is, if the touchscreen including icons is folded horizontally, corresponding icons move down in response to the folded shape and are simultaneously rearranged on the touchscreen.

As a result, the user can manipulate the smartphone of FIG. 1 using only one hand.

One embodiment describes a method for allowing a user who grasps the smartphone with only one hand to select any one of icons displayed on the touchscreen of the smartphone using a thumb of the hand, and a detailed description thereof will be given below.

In this case, it may be impossible for the user to select some icons displayed on the touchscreen using only the thumb of one hand grasping the smartphone according to screen size or the size of the hand or the length of thumb.

In order to solve this problem, if the user inputs a touch gesture corresponding to a predetermined icon rearrangement command to the touchscreen, the embodiment of the present disclosure moves icons incapable of being touched by a user thumb to a predetermined range where the icons can be touched by the thumb.

Figure 2:
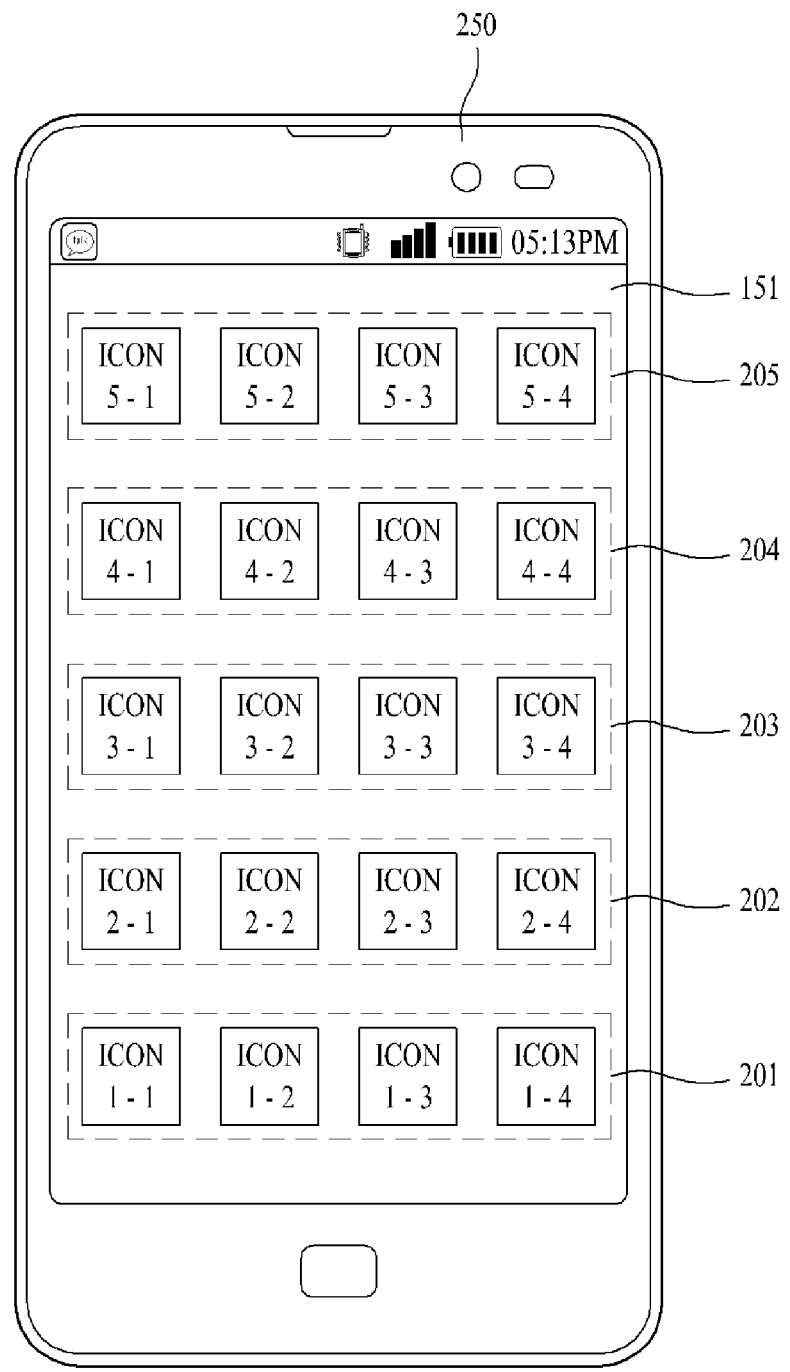
FIG. 2 is a front view illustrating a smartphone according to an embodiment of the present disclosure.

FIG. 2 is a front view illustrating the smartphone according to an embodiment of the present disclosure. Referring to FIG. 2, the smartphone includes the display unit 151 and a bezel unit 250 enclosing the display unit 151. The touchscreen of the display unit 151 includes a plurality of latticed icons, and the bezel unit 250 may include a camera, a cancel button, a manufacturer logo, etc.

As can be seen from FIG. 2, four icons are arranged horizontally on a touchscreen of the display unit 151, and five icons are arranged vertically on the touchscreen. In accordance with one embodiment of the present disclosure, the icons of the touchscreen shown in FIG. 2 are classified into first to fifth icon groups 201 to 205. That is, one icon group includes a plurality icons included in one row. In this case, the number of icon groups, the number of icons included in each icon group, and a total number of icons displayed on the touchscreen may be changed according to smartphone type, user selection, etc.

A detailed description thereof will hereinafter be given with reference to the icon arrangement structure of FIG. 2.

In the present disclosure, it is assumed that at least one icon contained in the fifth icon group 205 displayed on the touchscreen of FIG. 2 is not in contact with a thumb of a user hand grasping the smartphone.

In this case, the user inputs a touch gesture corresponding to a predetermined icon rearrangement command such that icons displayed on the touchscreen can be rearranged.

The present disclosure, if the user bends and stretches a finger on the touchscreen, i.e., if a stretching state of the user finger on the touchscreen is detected by the smartphone, assumes that this stretching action is stored in advance in the smartphone as a touch gesture corresponding to the icon rearrangement command.

Therefore, if the user inputs a touch gesture to the touchscreen by bending and stretching a finger on the touchscreen, the touch gesture is detected by the proximity sensor 141 and then output to the controller 180.

Examples of the proximity sensor 141 may include a transmissive photoelectric sensor, a direct reflective photoelectric sensor, a mirror reflective photoelectric sensor, a high frequency oscillation proximity sensor, a capacitive proximity sensor, a magnetic proximity sensor, an infrared proximity sensor, an ultrasonic sensor, an image sensor (or a pixel sensor), or the like.

The proximity sensor 141 may operate either in a contact operation mode for sensing a finger contact state or in a proximity touch mode for sensing a proximity touch action of a finger non-contact state. The proximity touch sensing method can be implemented as legacy technologies, for example, a method of mounting an ultrasonic sensor to a plurality of locations of the screen edge, an infrared scheme, a method employing a multi-point capacitive touch sensor, a method using an image sensor capturing an object located just above the screen, a capacitive scheme, and the like.

For example, the infrared scheme emits infrared light using an infrared LED, and measures the amount of infrared reflective light reflected from a sensed object (i.e., a finger) or the concentration position of reflected light, such that it can measure a distance from the object on the basis of the measurement result. The reflection amount is inversely proportional to the square of distance. The higher the reflection amount, the shorter the distance between a sensor and a user finger. The less the reflection amount, the longer the distance between the sensor the user finger. In another example, the capacitive scheme arranges a plurality of sensors for sensing touch inputs horizontally and vertically, sequentially applies a voltage signal to the horizontal and vertical directions of the smartphone, and generates charges in the sensors such that a current flows in the sensors. The human hand attracts charges. If a user finger contacts a cross point, a current is reduced by the amount of reduced charges, such that a contact point can be recognized. That is, according to the capacitive scheme, if an object such as a finger gradually approaches a touchscreen, capacitance of the sensors gradually increases. The shorter the distance between the touchscreen and the finger, the greater the capacitance. In other words, if a user finger approaches the touchscreen based on the capacitive scheme, proximity of the finger can be detected on the basis of changes of an electromagnetic field. In another example, it is possible to detect a thumb approaching a touchscreen using an image sensor in which each pixel includes a camera. That is, if an object such as a finger contacts a touchscreen, the image sensor scheme captures the object and generates a three dimensional (3D) image of the captured object, such that the shape of a user thumb can be recognized.

The controller 180 checks at least one of a finger height change and a finger shape change on the basis of a touch gesture detected by the proximity sensor 141, such that it can determine whether the touch gesture detected by the proximity sensor 141 corresponds to an icon rearrangement command.

In accordance with a first embodiment, the controller 180 measures a change in height (or length) between a thumb end and a touchscreen, such that it determines the occurrence of a touch gesture corresponding to an icon rearrangement command.

In accordance with a second embodiment, the controller 180 measures a change in shape of a user thumb, such that it determines a touch gesture corresponding to an icon rearrangement command.

In accordance with a third embodiment, although a touch gesture entered by the user is determined to be a touch gesture corresponding to the icon rearrangement command of the second or third embodiment, only when the position of the user thumb exceeds a reference line of a touchscreen, the controller 180 may finally determine a touch gesture corresponding to an icon rearrangement command. The above-mentioned operations can prevent malfunction of icon rearrangement. In this case, the position of the reference line may be pre-fixed, or may be changed according to which hand grasps the smartphone or according to the one-handed grasp position of the smartphone. For example, if the user grasps a lower part of the smartphone, the reference line moves downward. If the user grasps an upper part of the smartphone, the reference line moves upward.

Figure 3:
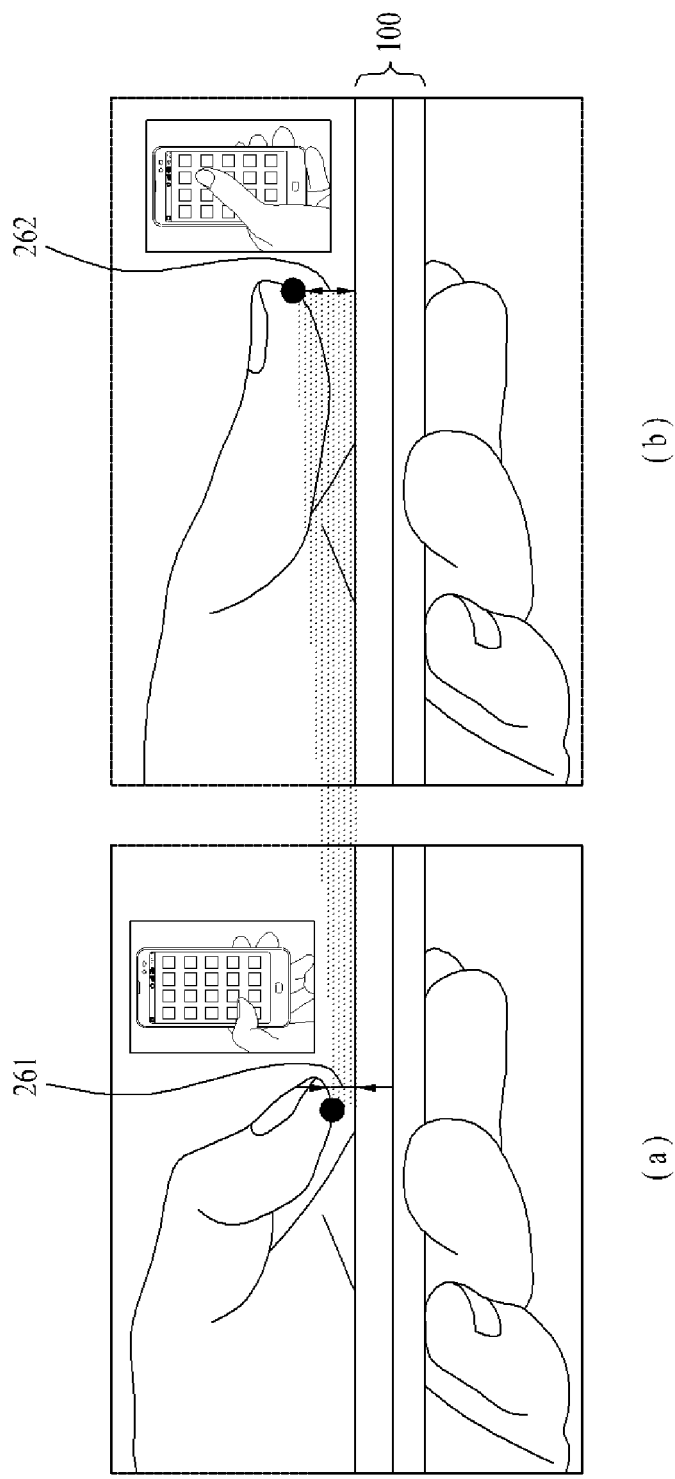
FIGS. 3(a) and 3(b) illustrate examples of methods for checking a touch gesture for icon rearrangement according to one embodiment of the present disclosure.

FIGS. 3(a) and 3(b) illustrate methods for recognizing an icon rearrangement command according to a first embodiment of the present disclosure.

That is, if the user bends a thumb on the touchscreen according to a non-contact type scheme as shown in FIG. 3(a) and then stretches the thumb on the touchscreen as shown in FIG. 3(b), this touch gesture is sensed by the proximity sensor 141 and output to the controller 180. The controller 180 measures a change in height between the thumb end and the touchscreen. In this case, the height between the thumb end and the touchscreen sequentially increases as denoted by 261 of FIGS. 3(a) and 262 of FIG. 3(b). If the length between the thumb end and the touchscreen increases, the controller 180 recognizes that the thumb is stretched, and determines the user-input touch gesture to be an icon rearrangement command. In this case, the height between the user thumb and the touchscreen may be measured when the user bends the thumb as denoted by 261 and may also be measured when the user stretches the thumb as denoted by 262. While the user bends and stretches the thumb, the height between the thumb end and the touchscreen may be measured at various positions.

Figure 4:
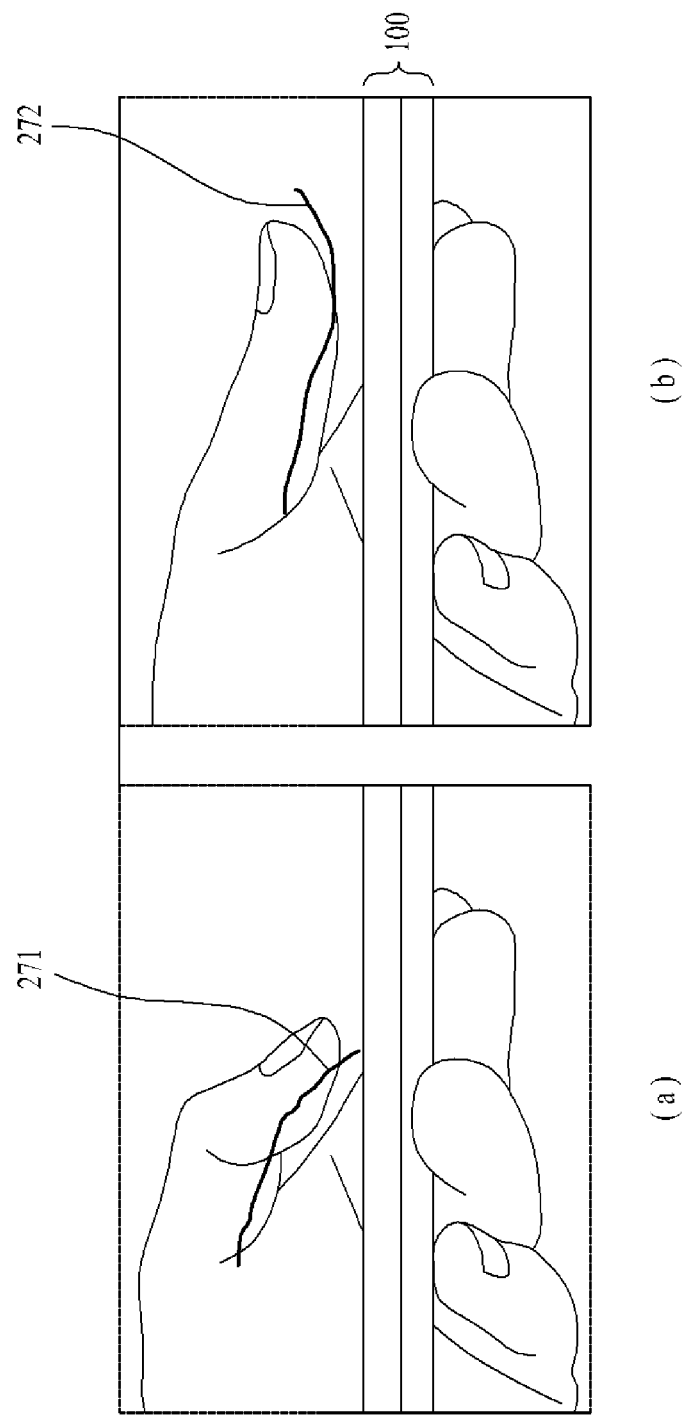
FIGS. 4(a) and 4(b) illustrate examples of methods for checking a touch gesture for icon rearrangement according to another embodiment of the present disclosure.

FIGS. 4(a) and 4(b) illustrate methods for recognizing an icon rearrangement command according to a second embodiment of the present disclosure.

That is, if the user bends a thumb on the touchscreen according to a non-contact type scheme as shown in FIG. 4(a) and then stretches the thumb on the touchscreen as shown in FIG. 4(b), this touch gesture is sensed by the proximity sensor 141 and output to the controller 180. The controller 180 measures change in the shape of a user finger. In this case, if the finger moves downward as denoted by 271 of FIG. 4(a), or if the finger moves from the left upper side to the right lower side and moves along a slight elliptical shape similar to a union operation mark as denoted by 272 of FIG. 4(b), the controller 180 recognizes the above finger state as a stretched finger state, such that it determines the user-input touch gesture to be an icon rearrangement command.

Figure 5:
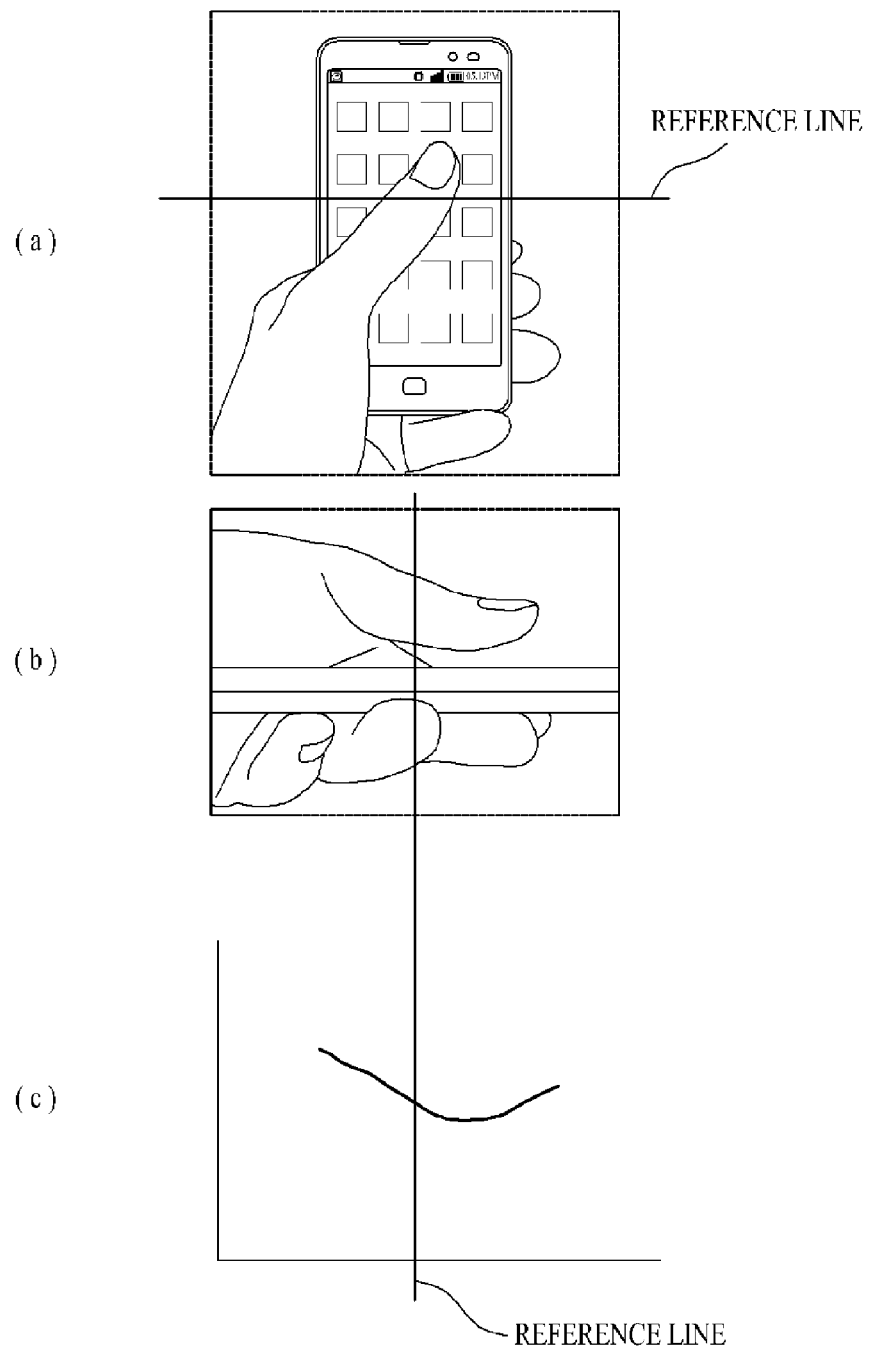
FIGS. 5(a) to 5(c) illustrate examples of methods for checking a touch gesture for icon rearrangement according to still another embodiment of the present disclosure.

FIGS. 5(a) and 5(b) illustrate methods for recognizing an icon rearrangement command according to a third embodiment of the present disclosure.

Although the user-input touch gesture is determined to be the icon rearrangement command according to the first embodiment shown in FIGS. 3(a) and 3(b) and/or the second embodiment shown in FIGS. 4(a) and 4(b), only when the position of the thumb end exceeds a reference line, the controller 180 determines the occurrence of an icon rearrangement command. In more detail, assuming that the position of the thumb end does not exceed the reference line, although the user-input touch gesture corresponds to a predetermined icon rearrangement command, the controller 180 does not determine the icon rearrangement command. In this case, the position of the reference line may be pre-fixed, or may be changed according to which hand grasps the smartphone or according to the one-handed grasp position of the smartphone. In addition, the reference line may be established horizontally or diagonally on the touchscreen as shown in FIGS. 5(a) to 5(c). In this case, the diagonal direction may be changed according to the left or right hand grasping the smartphone.

If the controller 180 determines that a user-input touch gesture according to at least one of the first to third embodiments corresponds to an icon rearrangement command, it generates the icon rearrangement command and outputs the same to the display unit 151.

Upon receiving the icon rearrangement command from the controller 180, the display unit 151 modifies the shape of the touchscreen including icons in a manner that the touchscreen is folded horizontally, so that icons of some icon groups move downward in response to the folded shape and the positions of the icons on the touchscreen can be rearranged. When paper is folded horizontally, a vertical length of the paper is reduced. For this reason, if the touchscreen is folded horizontally, a vertical length of the touchscreen is also reduced. In this case, the downward movement distance of icons according to the present disclosure is proportional to a reduced length caused by the folded touchscreen. The reduced length caused by the folded touchscreen is proportional to an angle created by the folded touchscreen. In accordance with one embodiment of the present disclosure, although some icons move downward on the touchscreen, all the original icons are displayed on the touchscreen. For this purpose, one embodiment of the present disclosure is characterized in that icons rearranged in the folded region are smaller in size than the original icons. In addition, one embodiment of the present disclosure can further modify the shape of icons to be rearranged in the folded region in response to an angle of a folded touchscreen.

Figure 6A:
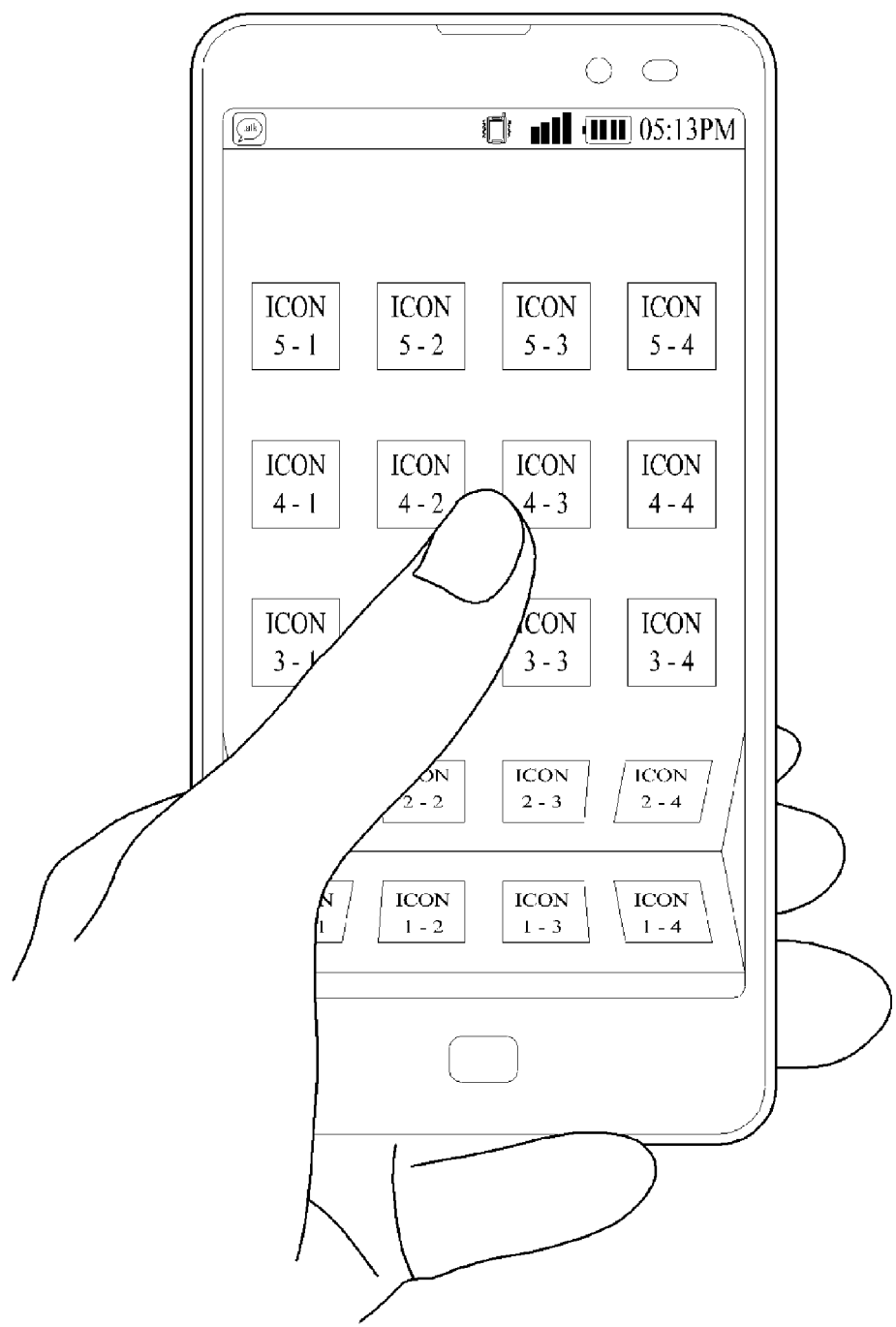
FIGS. 6A to 6E are various examples illustrating that some parts of a touchscreen are folded according to embodiments of the present disclosure.

Referring to FIG. 6A, when the user inputs a touch gesture by stretching a thumb on a touchscreen, the touchscreen is folded horizontally, some icons included in the touchscreen move downward in response to the folded shape in such a manner that the icons are rearranged on the touchscreen.

Figure 6B:
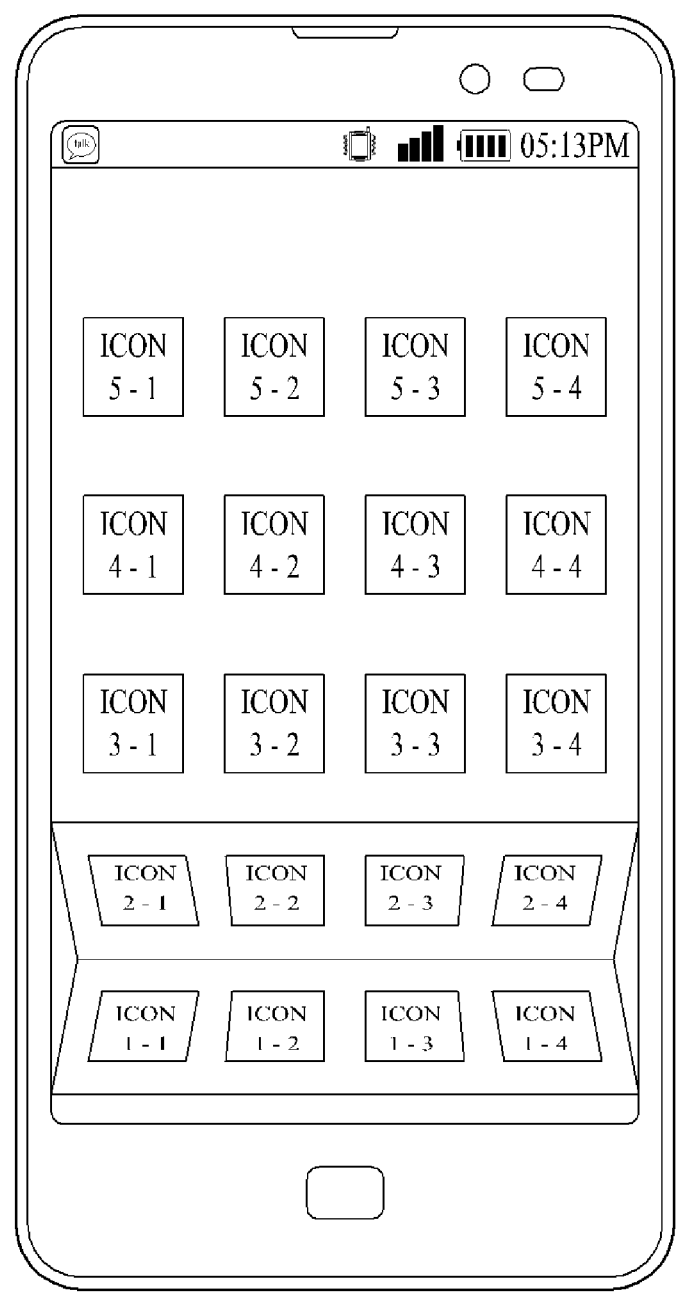
Figure 6C:
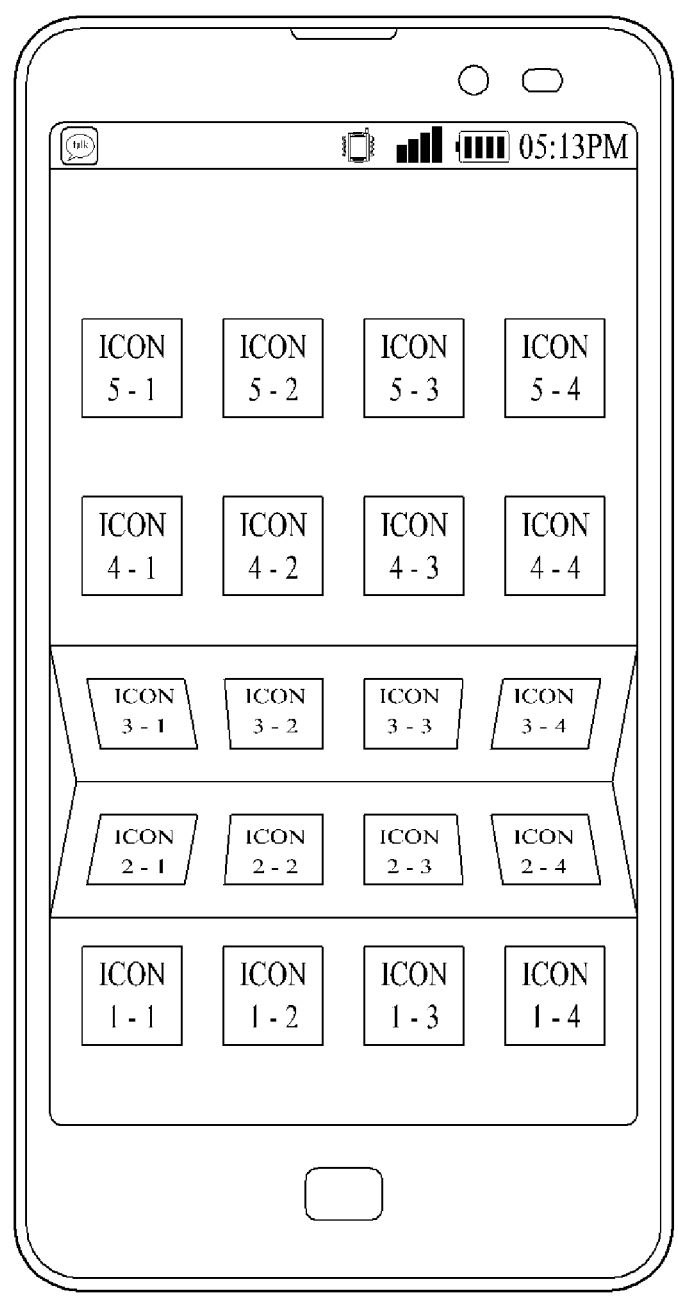
Figure 6D:
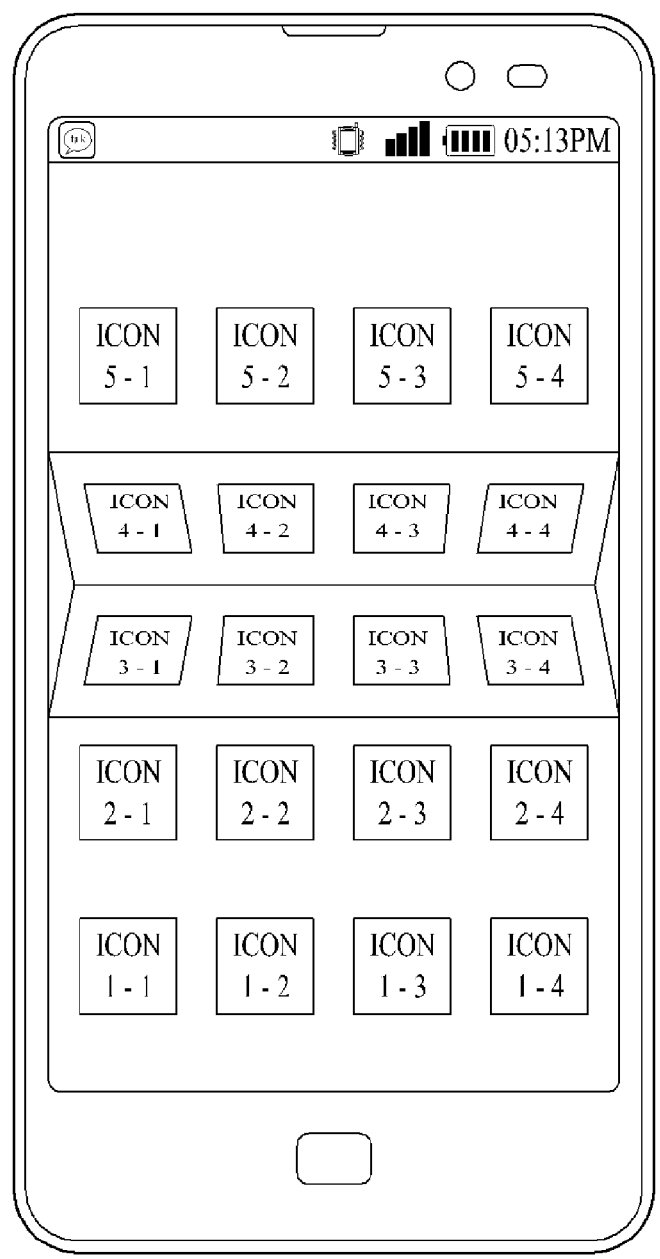

In this case, a touchscreen may be folded at a position between a first icon group 201 and a second icon group 202 as shown in FIG. 6A or 6B, a touchscreen may be folded at a position between a second icon group 202 and a third icon group 203 as shown in FIG. 6C, and a touchscreen may be folded at a position between a third icon group 203 and a fourth icon group 204 as shown in FIG. 6D. The touchscreen folded position may be changed according to a touchscreen size, the number of icons displayed on the touchscreen, and the arrangement shape of icons displayed on the touchscreen. In addition, the touchscreen folded position may be changed according to where a user finger for inputting a touch gesture is located on the touchscreen, according to a height between the finger end and the touchscreen, or according to the shape of a finger inputting the touch gesture.

In addition, the movement distance of icons displayed on the touchscreen may also be changed in response to an angle of a folded touchscreen. That is, the lower the angle of the folded touchscreen, the shorter the movement distance of icons. The higher the angle of the folded touchscreen, the longer the movement distance of icons.

For example, if the touchscreen is folded at a position between the first icon group 201 and the second icon group 202 as shown in FIG. 6B, icons of the first to fifth icon groups 201 to 205 move downward in response to the folded touchscreen shape, such that icons contained in the first icon group 201 and the second icon group 202 are rearranged in the folded region of the touchscreen and icons contained in the third to fifth icon groups 203 to 205 are rearranged in the unfolded region of the touchscreen. That is, although icons contained in the first to fifth icon groups 201 to 205 move downward, all icons are displayed on a single touchscreen. For convenience of description, the folded region on the touchscreen will hereinafter be referred to as a first region, and the unfolded region on the touchscreen will hereinafter be referred to as a second region. In this case, according to one embodiment, the icon size of the first or second icon group 201 or 202 contained in the first region is smaller than an original icon size. In this case, the icon size of the first or second icon group 201 or 202 may be changed according to an angle of the folded touchscreen. In addition, the icon shape of the first or second icon group 201 or 202 contained in the first region may also be changed according to an angle of the folded touchscreen. In accordance with one embodiment, the shape and size of icons contained in the third to fifth icon groups 203 to 205 of the second region may not be changed. In accordance with one embodiment, if the user touches icons contained in the second region corresponding to the unfolded region, functions of the icons are activated. In contrast, icons contained in the first region corresponding to the folded region are not activated by the user touch action. In another embodiment, icons displayed on the touchscreen are selected by user touch irrespective of the first or second region, such that the function corresponding to the selected icon can be carried out.

In another example, if the touchscreen is folded at a position between the second icon group 202 and the third icon group 203 as shown in FIG. 6C, icons of the second to fifth icon groups 202 to 205 move downward in response to the folded touchscreen shape, such that icons contained in the second icon group 202 and the third icon group 203 are rearranged in the first region, and icons contained in the fourth to fifth icon groups 204 and 205 are rearranged in the second region. In this case, according to one embodiment, the first icon group 201 is contained in the second region, and the positions of icons of the first icon group 201 are not changed. In this case, the icon size of the second or third icon group 202 or 203 contained in the first region is smaller than an original icon size. In this case, the icon size of the second or third icon group 202 or 203 may be changed according to an angle of the folded touchscreen. In addition, the icon shape of the second or third icon group 202 or 203 contained in the first region may also be changed according to an angle of the folded touchscreen. In accordance with one embodiment, the shape and size of icons contained in the first, fourth, and fifth icon groups 201, 204, and 205 of the second region are not changed. In accordance with one embodiment, if the user touches icons contained in the second region corresponding to the second region, functions of the icons contained in the second region are activated. In contrast, icons contained in the first region corresponding to the first region are not activated by the user touch action. In another embodiment, icons displayed on the touchscreen are selected by the user touch irrespective of the first or second region, such that the function corresponding to the selected icon can be carried out.

In another example, if the touchscreen is folded at a position between the third icon group 203 and the fourth icon group 204 as shown in FIG. 6D, icons of the third to fifth icon groups 203 to 205 move downward in response to the folded touchscreen shape, such that icons contained in the third icon group 203 and the fourth icon group 204 are rearranged in the first region, and icons contained in the fifth icon group 205 are rearranged in the second region. In this case, according to one embodiment, the first and second icon groups 201 and 202 are contained in the second region, and the positions of icons of the first and second icon groups 201 and 202 are not changed. In this case, the icon size of the third or fourth icon group 203 or 204 contained in the first region is smaller than an original icon size. In this case, the icon size of the third or fourth icon group 203 or 204 may be changed according to an angle of the folded touchscreen. In addition, the icon shape of the third or fourth icon group 203 or 204 contained in the first region may also be changed according to an angle of the folded touchscreen. In accordance with one embodiment, the shape and size of icons contained in the first, second, and fifth icon groups 201, 202, and 205 of the second region are not changed. In accordance with one embodiment, if the user touches icons contained in the second region corresponding to the second region, functions of the icons contained in the second region are activated. In contrast, icons contained in the first region corresponding to the first region are not activated by the user touch action. In another embodiment, icons displayed on the touchscreen may be selected by the user touch irrespective of the first or second region, such that the function corresponding to the selected icon can be carried out.

FIGS. 6A to 6D illustrate that the touchscreen is folded externally in the form of '∧' or folded internally in the form of '∨'.

If the touchscreen is folded as shown in one of FIGS. 6A to 6D, icons of the fifth icon group 205 move downward for icon rearrangement on the touchscreen, such that the user grasping the smartphone with one hand can touch icons of the fifth icon group 205 using a thumb of the user hand.

In accordance with another embodiment, if the user inputs one more touch gesture by bending and stretching the finger, the touchscreen is folded once more. That is, the touchscreen is folded two times. For example, although the touchscreen is folded as shown in any one of FIGS. 6A to 6D and icons of the fifth icon group 205 move downward on the touchscreen, assuming that the user thumb does not contact the icons of the fifth icon group 205, the user can input one more touch gesture corresponding to the icon rearrangement command.

Figure 6E:
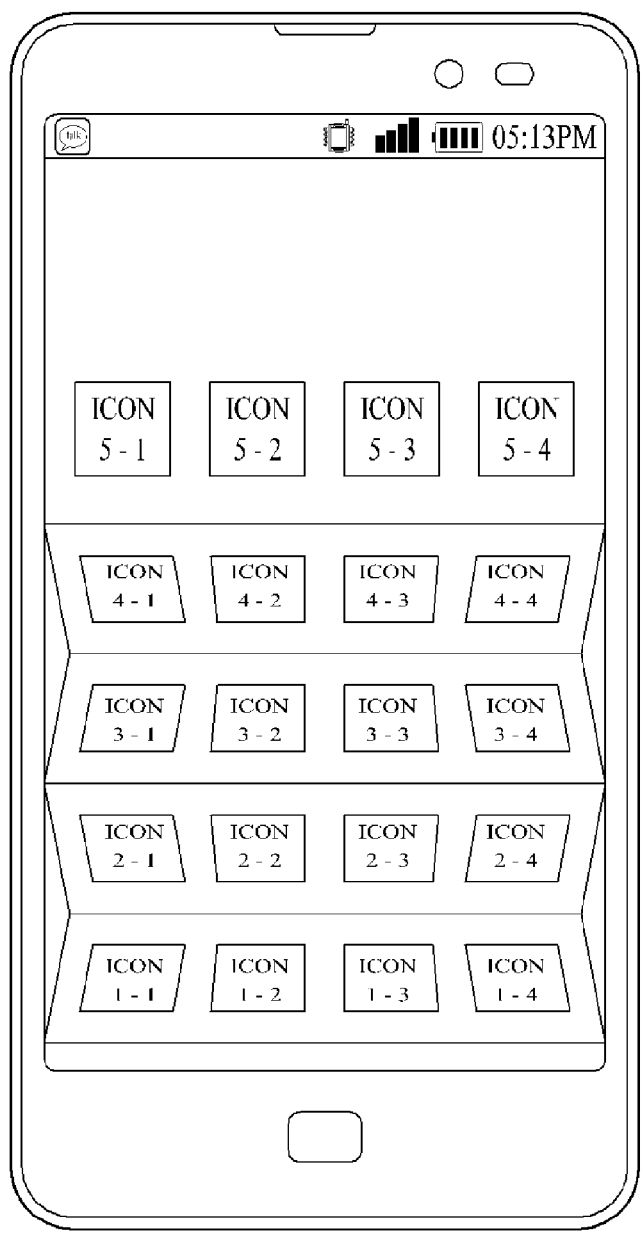

Referring to FIG. 6E, under the condition that the touchscreen is folded at a position between the first icon group 201 and the second icon group 202 as shown in FIG. 6B, if the user inputs a touch gesture corresponding to the icon rearrangement command, the touchscreen may be folded once more not only at a position between the second icon group 202 and the third icon group 203, but also at a position between the third icon group 203 and the fourth icon group 204. In this case, icons of the third to fifth icon groups 203 to 205 move downward again in response to the folded touchscreen shape, and at the same time icons contained in the first to fourth icon groups 201 to 204 are rearranged in the first region corresponding to the folded region and icons contained in the fifth icon group 205 are rearranged in the second region corresponding to the unfolded region. That is, although icons contained in the first to fifth icon groups 201 to 205 move downward again, all icons are displayed on a single touchscreen. In this case, according to one embodiment, the size of each icon of the third and fourth icon groups 203 and 204 contained in the first region is smaller than the size of an original icon. The size of each icon may be changed in response to an angle of the folded touchscreen. In addition, the shape of icons of the third and fourth icon groups 203 and 204 contained in the first region may be changed in response to the angle of the folded touchscreen. For example, the first to fourth icon groups 201 to 204 are contained in the first region, icons of the first and fourth icon groups 201 to 204 are configured to have the same size and are displayed in smaller size than icons of the fifth icon group 205 contained in the second region. In another example, icons of the first and second icon groups 201 and 202 may be displayed smaller than icons of the third and fourth icon groups 203 and 204. In accordance with one embodiment, the shape and size of icons contained in the fifth icon group 205 are not changed. In accordance with one embodiment, icons contained in the second region are activated by the user touching the icons, and icons contained in the first region are not activated by the user touching action. In another embodiment, icons displayed on the touchscreen are selected by the user touch irrespective of the first or second region, such that the function corresponding to the selected icon can be carried out.

In accordance with still another embodiment, under the condition that the touchscreen is folded at a position between the third icon group 203 and the fourth icon group 204 as shown in FIG. 6D, if the user inputs one more touch gesture corresponding to the icon rearrangement command, the touchscreen may be folded once more not only at a position between the first icon group 201 and the second icon group 202, but also at a position between the second icon group 202 and the third icon group 203.

The number of touchscreen folding times according to the present disclosure may be changed according to the touchscreen size and the number of icon groups displayed on the touchscreen.

If the user touches a specific icon on the touchscreen shown in FIGS. 6A to 6E, the function corresponding to the touched icon can be carried out. If the user touches a specific icon located in the unfolded region, the corresponding function can be carried out. On the other hand, under the condition that the touchscreen is folded by the user who inputs a touch gesture corresponding to the icon rearrangement command, although the touch gesture is released, the folded state of the touchscreen and the icon rearrangement state are maintained without change according to the embodiments of the present disclosure.

In this case, the folded touchscreen may be realized by various embodiments. For example, after the corresponding function is performed by a touch action of a specific icon under the condition that the touchscreen is folded one or more times, the folded touchscreen can be automatically released. In another example, after a touch gesture corresponding to the icon rearrangement release command is predetermined and stored, if the user inputs the corresponding touch gesture, the folded touchscreen may be released. In another example, if no action is entered by the user until a predetermined time elapses, the folded touchscreen may be released. If the folded touchscreen is released, the folded touchscreen returns to a normal touchscreen as shown in FIG. 2. In accordance with one embodiment, the touch gesture corresponding to the icon rearrangement release command may also be established as another touch gesture (for example, a touch gesture for stretching and hooking a finger) opposite to the icon rearrangement command.

The above-mentioned description has exemplarily disclosed that the touchscreen is folded from the top to the bottom for convenience of description. In another example, the touchscreen may also be folded diagonally as necessary. For example, when the user inputs a touch gesture by bending and stretching the finger on the touchscreen, assuming that the touch gesture is input diagonally on the touchscreen, the touchscreen may also be folded diagonally. For example, if the user bends and stretches the thumb from the right side to the left side on the touchscreen, the touchscreen may be folded in the direction from the left upper side to the right lower side, or vice versa.

In the meantime, the display unit 151 of the present disclosure may be composed of multiple layers. For example, a layer (hereinafter referred to as a background screen) for displaying a background image, a layer for displaying icons configured to activate the corresponding functions by the user touch, etc. In this case, a background screen and a touchscreen may be folded simultaneously to rearrange icons, and the background screen remains unchanged and only the touchscreen may be folded. If only the touchscreen is folded, the touchscreen is displayed in specific color such that the user can view the folded touchscreen state. The above-mentioned description has disclosed that the user inputs a touch gesture corresponding to the icon rearrangement command or the icon rearrangement release command using the non-contact type scheme on the touchscreen. The above-mentioned example is disclosed only for illustrative purposes, and the scope or spirit of the present disclosure is not limited thereto. The user may input a touch gesture corresponding to either the icon rearrangement command or the icon rearrangement release command using the contact-type scheme on the touchscreen. For example, if the user puts a thumb on the touchscreen and moves (or pushes) the thumb downward, this touch action may be recognized as a touch gesture corresponding to the icon rearrangement command. In contrast, if the user moves (or pushes) the thumb upward, this touch action may be recognized as a touch gesture corresponding to the icon rearrangement release command. If the user touch action is recognized as the touch gesture corresponding to the icon rearrangement command, the operations shown in FIGS. 6A to 6E are carried out, and as such a detailed description thereof will be omitted herein for convenience of description.

If the user inputs a touch gesture corresponding to the icon rearrangement command, another embodiment may also provide a user interface (UI) for allowing icons of at least one icon group to move downward on the touchscreen in such a manner that the icons are gradually faded away from the touchscreen. For example, icons of the first and second icon groups 201 and 202 gradually move downward on the touchscreen in such a manner that the icons may be rearranged to be faded away from the touchscreen. In this case, icons of the third to fifth icon groups 203 to 205 move downward on the touchscreen in proportion to the downward movement distance (i.e., the fading degree) of the first and second icon groups 201 and 202, such that the icons are rearranged on the touchscreen. In accordance with one embodiment, icons of the first and second icon groups 201 and 202 are displayed in smaller size than icons of the third to fifth icon groups 203 to 205. Icons of the first to fifth icons 201 to 205 are displayed on the touchscreen. In accordance with the present disclosure, a specific region having an icon group including smaller-sized icons will hereinafter be referred to as a first region, and a specific region having a data group in which the size of icons is unchanged will hereinafter be referred to as a second region. In this case, unexplained parts (specifically, first and second regions), associated description thereof, and icon rearrangement release will hereinafter be described with reference to FIGS. 6A to 6E.

In accordance with another embodiment, if the user inputs a touch gesture corresponding to the icon rearrangement command, icons of at least two icon groups of the touchscreen move downward for icon rearrangement such that icons of at least one icon group are displayed in smaller size. For example, icons of the fourth and fifth icon groups 204 and 205 move downward for icon rearrangement in such a manner that icons of the fourth icon group 204 may be displayed in smaller size. In another example, icons of the first to fifth icons 201 to 205 move downward for icon rearrangement in such a manner that icons of the first to fourth icon groups 201 to 204 may be displayed in smaller size. In accordance with the present disclosure, a specific region having an icon group including smaller-sized icons will hereinafter be referred to as a first region, and a specific region having a data group in which the size of icons is unchanged will hereinafter be referred to as a second region. In this case, unexplained parts (specifically, first and second regions), associated description thereof, and icon rearrangement release will hereinafter be described with reference to FIGS. 6A to 6E.

In accordance with still another embodiment, the touchscreen may be classified into an active region and an inactive region.

Figure 7:
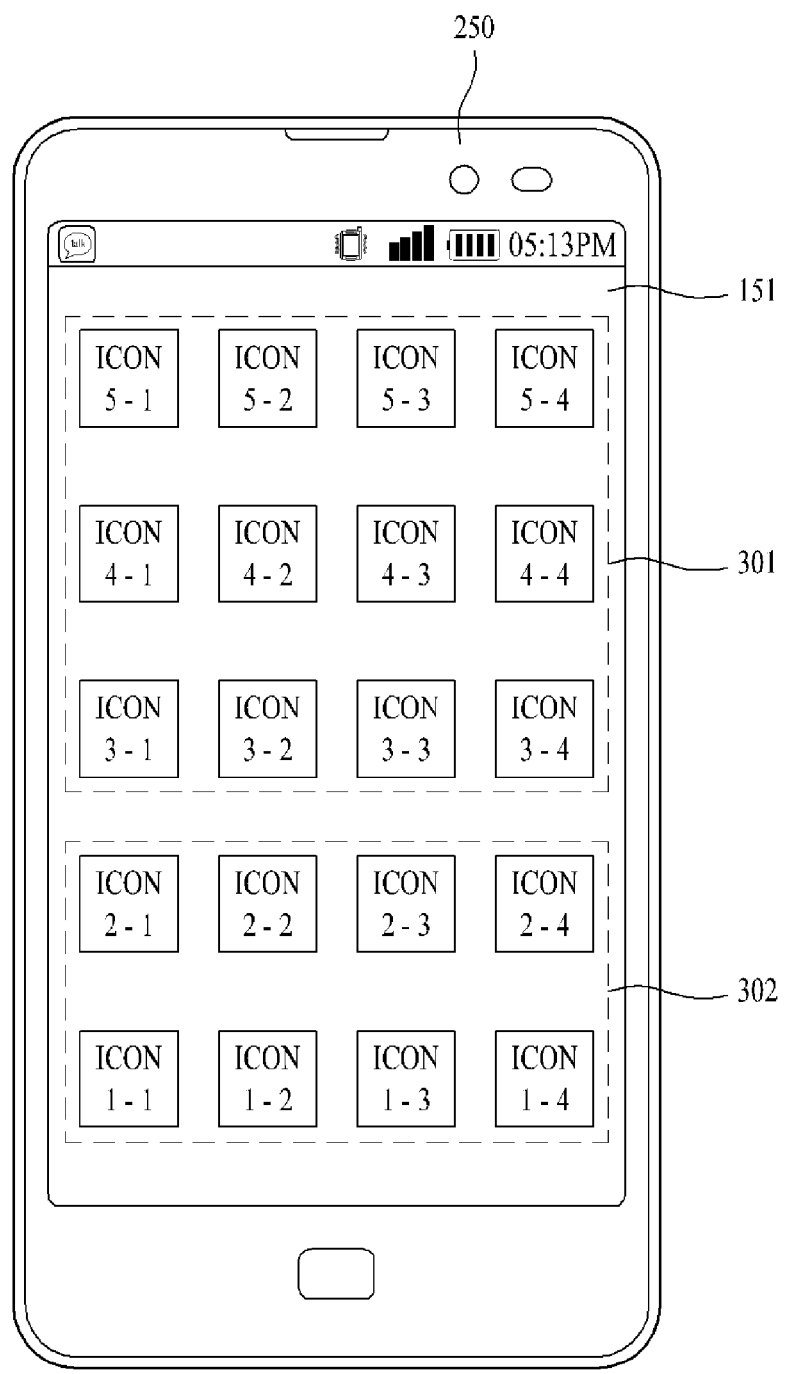
FIG. 7 shows an example of a touchscreen classified into an active region and an inactive region according to an embodiment of the present disclosure.

FIG. 7 shows an example of a touchscreen classified into an active region 301 and an inactive region 302. The active region 301 can be scrolled on the touchscreen, and the touchscreen can be folded at the active region 301. In addition, the functions corresponding to icons of the active region 301 can be performed by an icon touch action. It is impossible for the inactive region 302 to be touched or scrolled by the user finger. Although the user palm or finger touches the icons of the inactive region 302, the function corresponding to the touched icon is not performed. In addition, the screen is not folded. That is, icons of the active region 301 are displayed in the active mode, and icons of the inactive region 302 are displayed in the inactive mode. For example, a specific region including icons of the first and second icon groups 201 and 202 may be established as the inactive region 302, and a specific region including icons of the third to fifth icon groups 203 to 205 may be established as the active region 301. In this case, folding of the touchscreen may be achieved between the third icon group 203 and the fourth icon group 204.

One embodiment of the present disclosure discloses a method for enabling the user who grasps the smartphone with only one hand to input a touch gesture corresponding to the icon rearrangement command using a thumb of the hand according to the contact-type scheme or the non-contact type scheme, and a method for enabling the user to select a desired icon on the touchscreen where touchscreen folding and icon rearrangement have been achieved. In accordance with another embodiment, if a touch gesture corresponding to a predetermined icon rearrangement command is entered by any of fingers, the above-mentioned touchscreen folding and icon rearrangement can also be applied to other examples without difficulty.

In accordance with one embodiment of the present disclosure, only when the user who grasps the smartphone with one hand inputs a touch gesture corresponding to the predetermined icon rearrangement command, can the touchscreen be folded for icon rearrangement. Specifically, only when the user who grasps the smartphone with only one hand inputs a touch gesture corresponding to a predetermined icon rearrangement command using a finger (e.g., a thumb) of the hand, can the touchscreen be folded and at the same time icons can be rearranged. For example, assuming that the user grasps the smartphone with his or her left hand, the touchscreen can be folded for icon rearrangement only when the user inputs a touch gesture corresponding to a predetermined icon rearrangement command using a thumb of the left hand. In contrast, assuming that the user grasps the smartphone with his or her right hand, the touchscreen can be folded for icon rearrangement only when the user inputs a touch gesture corresponding to a touch gesture corresponding to a predetermined icon rearrangement command using a thumb of the right hand.

For these purposes, the embodiment of the present disclosure must determine which hand of the user grasps the smartphone, and must also determine whether the user inputs a touch gesture using any fingers of the hand grasping the smartphone.

In accordance with one embodiment of the present disclosure, in order to determine which hand of the user grasps the smartphone, the sensing unit 140 may further include a multi-touch detection unit.

A method for determining whether the user inputs a touch gesture using a finger of a hand grasping the smartphone can be realized by various embodiments. For example, a user finger for inputting the touch gesture is captured by various cameras (for example, a camera mounted to an image sensor, an infrared camera, and a general camera mounted to the smartphone), and the captured finger image is shaped as a 3D image, such that it can be recognized which one of the left hand and the right hand of the user includes a finger for inputting the touch gesture. For this purpose, in accordance with one embodiment of the present disclosure, under the condition that the user grasps the smartphone with the right hand, shape information of fingers of the right hand of the user and shape information of fingers of the left hand of the user are prestored; and under the condition that the user grasps the smartphone with the left hand, shape information of fingers of the left hand of the user and shape information of fingers of the right hand are prestored. In accordance with another embodiment, the proximity sensor 141 of the sensing unit 140 is further mounted to the bezel unit 250 of the smartphone such that it is possible to detect which finger is used for touch gesture input. For convenience of description, the proximity sensor mounted to the bezel unit 250 will hereinafter be referred to as a proximity detection unit.

Figure 8:
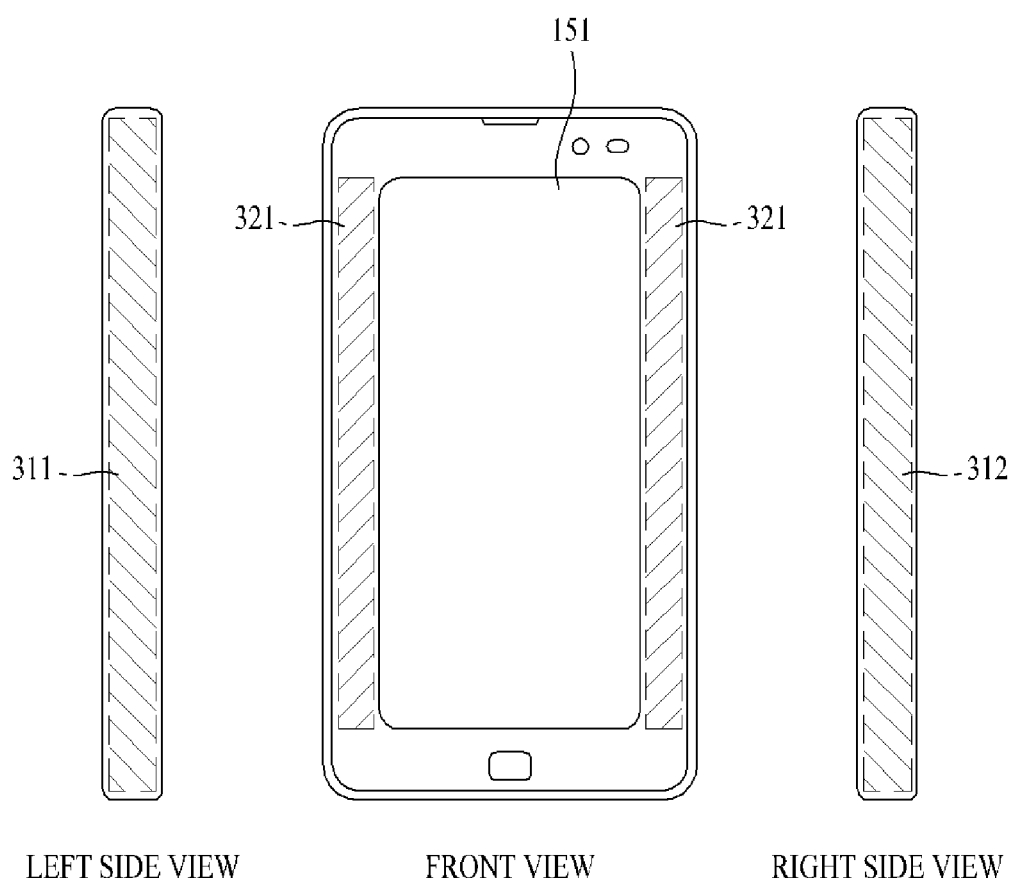
FIG. 8 shows a front view, a left side view, and a right side view of the smartphone according to embodiments of the present disclosure.

FIG. 8 shows a front view, a left side view, and a right side view of the smartphone according to embodiments of the present disclosure.

The multi-touch detection unit may be mounted to at least one of both sides of the smartphone. For example, the multi-touch detection unit may include a first multi-touch detector 311 mounted to one side (e.g., left side) of the smartphone and a second multi-touch detector 312 mounted to the other side (e.g., right side) of the smartphone.

The proximity detection unit includes a first proximity detector 321 mounted to one end of the bezel unit 250 and a second proximity detector 322 mounted to the other end of the first proximity detector 321. Although FIG. 8 shows that the first and second proximity detectors 321 and 322 are arranged over the entire surface of a lateral end of the bezel unit 250, it should be noted that the first and second proximity detectors 321 and 322 may also be located only at some parts (e.g., lower parts) of a lateral end of the bezel unit 250 according to some embodiments.

Figure 9:
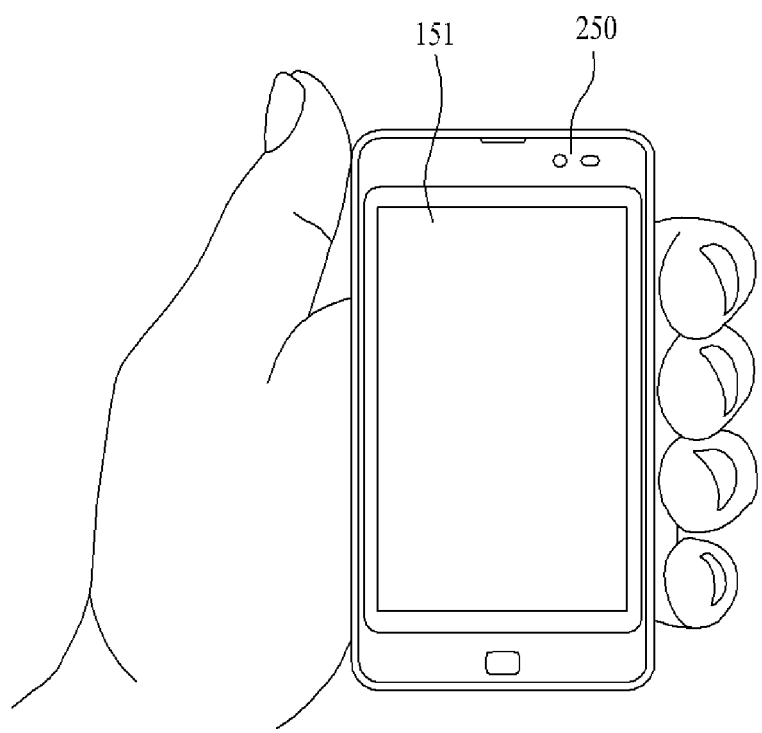
FIG. 9 shows the appearance of the smartphone grasped by a left hand of a user according to embodiments of the present disclosure.

FIG. 9 shows the appearance of the smartphone grasped by a left hand of a user according to embodiments of the present disclosure.

Referring to FIG. 9, the user may grasp the smartphone with only one hand. Although FIG. 9 exemplarily shows that the hand grasping the smartphone is a left hand, it should be noted that the right hand may also be used in place of the left hand.

That is, if the user grasps the smartphone with the left hand, the multi-touch detection unit of the sensing unit 140 detects a plurality of touch points touched by the left hand, and the controller 180 determines which hand grasps the smartphone on the basis of the detection result.

In other words, the multi-touch detection unit detects a plurality of touch points for touching lateral surfaces of the smartphone. In more detail, the multi-touch detection unit detects a plurality of touch points generated when the user grasps the smartphone with his or her hand.

In accordance with one embodiment, each of the first multi-touch detector 311 and the second multi-touch detector 312 contained in the multi-touch detection unit is implemented as one sensor, such that the resultant two sensors may be mounted to both sides of the smartphone. In this case, the multi-touch detection unit may be implemented as a multi-touch sensor capable of detecting a plurality of touch points. That is, the multi-touch detectors may detect coordinates or number of touch points touched by the left hand.

As described above, the multi-touch sensors for detecting a plurality of touch points are mounted to both sides of the smartphone. As a result, a plurality of touch points generated when the user grasps the smartphone with his or her hand can be detected, and it is possible to determine which hand grasps the smartphone on the basis of the detection result.

Figure 10:
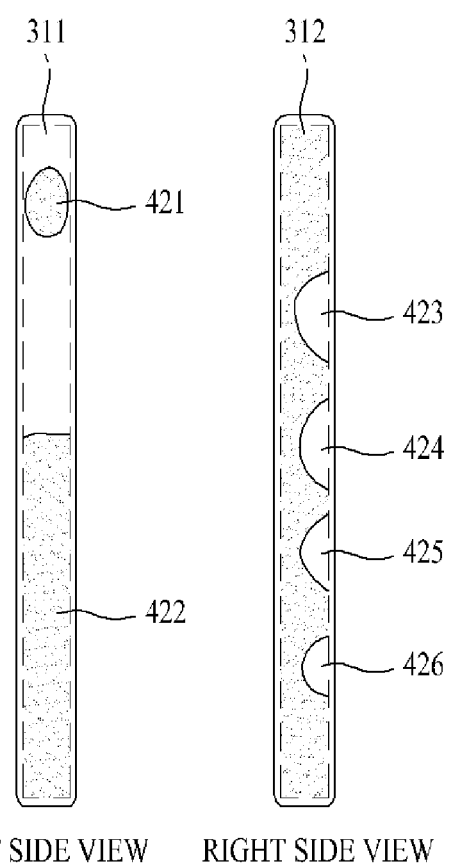
FIG. 10 shows examples of touch points detected by multi-touch detectors according to embodiments of the present disclosure.

Assuming that the user grasps the smartphone with the left hand as shown in FIG. 9, the multi-touch detection unit can detect a touch point as shown in FIG. 10.

FIG. 10 shows examples of touch points detected by multi-touch detectors according to embodiments of the present disclosure.

For example, if the user grasps the smartphone with the left hand, the first multi-touch detector 311 mounted to the left lateral surface of the smartphone can detect a plurality of touch points 421 and 422 as shown in FIG. 10. The touch points 421 and 422 detected by the first multi-touch detector 311 may respectively correspond not only to a thumb grasping the smartphone, but also to a palm part located below the thumb.

If the user grasps the smartphone with the left hand, the second multi-touch detector 312 mounted to the right side of the smartphone can detect a plurality of touch points (423, 424, 425, 426).

The touch points (423, 424, 425, 426) detected by the second multi-touch detector 312 may respectively correspond to touch points of an index finger, a middle finger, a ring finger, and a little finger of the left hand grasping the smartphone. The second multi-touch detector 312 may detect three or less touch points instead of four touch points according to how the user grasps the smartphone.

The controller 180 can determine a hand of the user who grasps the smartphone on the basis of the result detected by the multi-touch detector.

In accordance with one embodiment, the controller 180 compares the number of touch points detected by the first multi-touch detector 311 with the number of touch points detected by the second multi-touch detector 312, and determines the hand, the number of touch points of which is smallest, to be a hand grasping the smartphone.

For example, if the first multi-touch detector 311 detects a total of two touch points 421 and 422 as shown in FIG. 10 and the second multi-touch detector 312 detects a total of four touch points (423, 424, 425, 426), the controller 180 may compare numbers of touch points detected by two multi-touch detectors. As a result, the controller 180 may determine one hand (i.e., the left hand) for the first multi-touch detector 311 having detected a smaller number of touch points to be a hand grasping the smartphone.

When the user grasps the smartphone, the first multi-touch detector 311 serving as a multi-touch detector for one hand grasping the smartphone can detect two touch points 421 and 422 respectively touched by a thumb and a palm part located below the thumb; and the second multi-touch detector 312 serving as an opposite multi-touch detector can detect four touch points (423, 424, 425, 426) touched by an index finger, a middle finger, a ring finger, and a little finger. That is, the multi-touch detector for one hand grasping the smartphone detects a smaller number of touch points than the opposite multi-touch detector.

In accordance with another embodiment, it is possible to determine which hand grasps the smartphone on the basis of the area of the touch point. For this purpose, the multi-touch detector can detect a plurality of touch points and can also detect the area of each touch point. That is, the controller 180 may determine the hand of one multi-touch detector that has detected a touch area exceeding a predetermined area value, among the first and second multi-touch detectors 311 and 312, to be a hand grasping the smartphone.

In accordance with one embodiment, the predetermined area is larger than the area of a touch point touched by the finger, and is smaller than the area of a touch point touched by the palm part located below a thumb.

Referring to FIG. 10, the controller 180 can compare the areas of touch points (421, 422) detected by the first multi-touch detector 311 and the areas of touch points (423, 424, 425, 426) detected by the second multi-touch detector 312 with predetermined area values of the smartphone.

The touch point 422 detected by the first multi-touch detector 311 among the first and second multi-touch detectors 311 and 312 is larger in size than the touch points (421, 423, 424, 425, 426), because the area of a touch point touched by the palm is larger than the area of a touch point touched by the finger end.

Therefore, assuming that the predetermined area value is established to be larger than the area of the touch point touched by the finger and is established to be smaller than the area of the touch point touched by the palm part located below a thumb, the controller 180 compares the area of each touch point detected by the first and second multi-touch detectors 311 and 312 with the predetermined area value, such that it can determine a user hand grasping the smartphone.

For example, if the user grasps the smartphone with the left hand, the touch point 422 touched by the palm is detected by the first multi-touch detector 311, such that the controller 180 can determine the left hand indicating a hand for the first multi-touch detector 311 to be a hand grasping the smartphone.

In contrast, if the user grasps the smartphone with the right hand, a point touched by the palm is detected by the second multi-touch detector 312, such that the controller 180 can determine the right hand indicating a hand for the second multi-touch detector 312 to be a hand grasping the smartphone.

In accordance with another embodiment, if one of the first and second proximity detectors 321 and 322 of the proximity detection unit detects proximity or approach of a conductive object, the controller 180 determines a finger touched state.

The proximity detector may detect approach of the conductive object (e.g., a finger) using the proximity sensor. That is, the proximity detector detects not only a direct touch state of the conductive object but also an indirect touch state formed when the conductive object is slightly spaced apart from the smartphone by a predetermined distance. In accordance with one embodiment, the proximity sensor of the proximity detector may be a 3D touch sensor for detecting a conductive object approaching within a predetermined range.

As described above, since the proximity detectors are located at both sides of the bezel unit 250 surrounding the touchscreen, it can be determined whether the conductive object (for example, a user finger) for touching an icon displayed on the touchscreen approaches the touchscreen.

Referring to FIG. 8, the proximity detection unit is classified into a first proximity detector 321 and a second proximity detector 322 and the first and second proximity detectors 321 and 322 are located at both sides of the touchscreen. As a result, the approaching direction of the user finger can be detected, and a touch finger can be determined according to the detection result.

Figure 11:
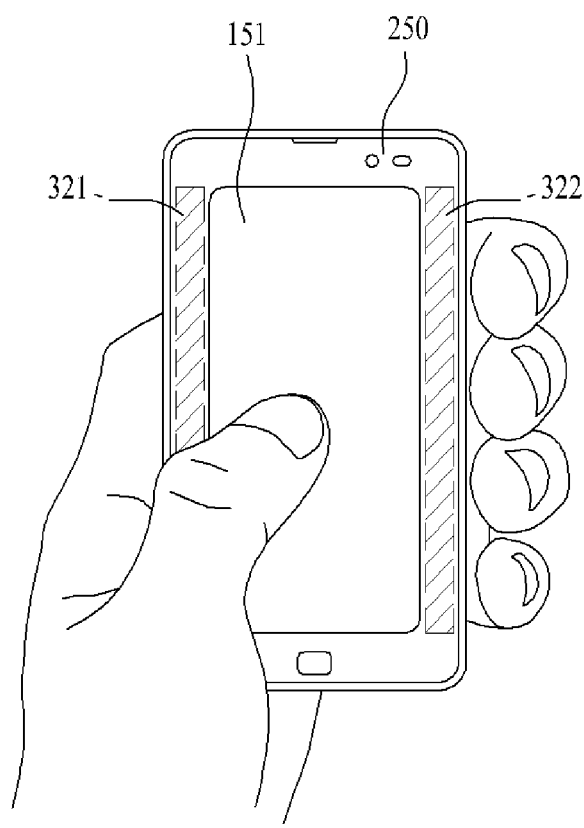
FIG. 11 shows the appearance of the smartphone grasped by a left hand of the user who touches a touchscreen using a thumb of the left hand according to embodiments of the present disclosure.

FIG. 11 shows the appearance of the smartphone grasped by a left hand of the user who touches a touchscreen using a thumb of the left hand according to embodiments of the present disclosure.

In this case, the first proximity detector 321 among the first and second proximity detectors 321 and 322 detects approach of a thumb of the left hand of the user. In more detail, if the user moves a thumb of the left hand toward the touchscreen under the condition that the user grasps the smartphone with the left hand, the first proximity detector 321 mounted to the left lateral side of the touchscreen can detect approach of the thumb of the left hand. In accordance with one embodiment, if it is determined that the hand grasping the smartphone is identical to the hand touching the touchscreen, the controller 180 may determine that the smartphone is controlled by one hand of the user. In contrast, if the hand grasping the smartphone is different from the hand touching the touchscreen, the controller 180 may determine that the smartphone is controlled using two hands.

In accordance with another embodiment, if the multi-touch detector at the hand grasping the smartphone detects one touch point, the controller 180 may determine the touching hand to be the same hand as the hand grasping the smartphone.

If the user grasps the smartphone with the left hand as shown in FIG. 9, the first multi-touch detector 311 located at the same side as the hand grasping the smartphone can detect two touch points. That is, the first multi-touch detector 311 can detect a touch point of a thumb of the left hand and a touch point of a palm part located below the thumb.

If the user who grasps the smartphone with one hand contacts a touchscreen by moving a thumb of the same hand, the first multi-touch detector 311 detects only one touch point (i.e., a touch point caused by a palm part located below the thumb).

Therefore, if the multi-touch detector at the same side as the hand grasping the smartphone detects only one touch point, the controller 180 determines that the touching hand is identical to the hand grasping the smartphone, such that it can recognize one-handed control of the smartphone.

Figure 12:
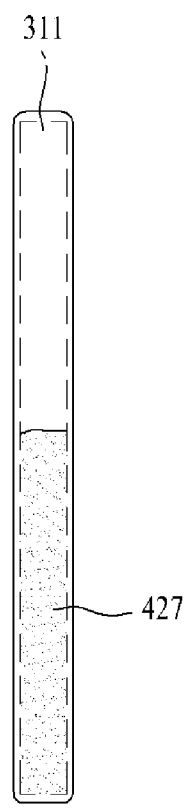
FIG. 12 shows exemplary touch points detected by a multi-touch detector when the user manipulates the smartphone using only one hand according to embodiments of the present disclosure.

FIG. 12 shows exemplary touch points detected by a multi-touch detector when the user manipulates the smartphone using only one hand according to embodiments of the present disclosure.

If the user who grasps the smartphone with the left hand contacts a touchscreen by moving a thumb of the left hand as shown in FIG. 12, the first multi-touch detector 311 located at the same side as the hand grasping the smartphone can detect one touch point 427. Therefore, if the multi-touch detector located at the same side as the hand grasping the smartphone detects only one touch point 427, the controller 180 can determine that the touching hand is identical to the hand grasping the smartphone.

Figure 13:
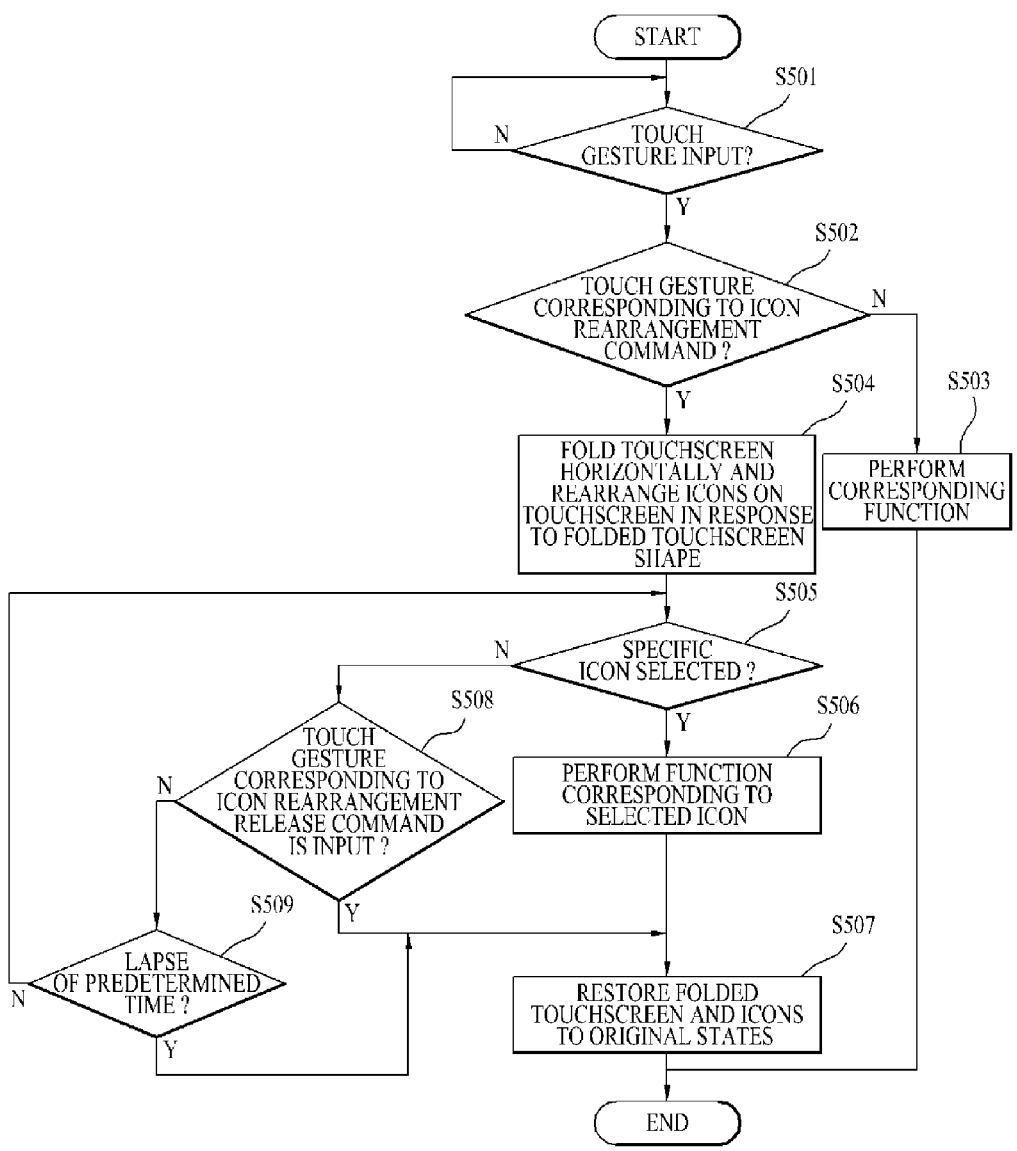
FIG. 13 is a flowchart illustrating a method for controlling a user interface of the smartphone according to an embodiment of the present disclosure.

FIG. 13 is a flowchart illustrating a method for controlling a user interface (UI) of the smartphone according to an embodiment of the present disclosure.

Referring to FIG. 13, if the user inputs a touch gesture in step S501, it is determined whether the input touch gesture is a touch gesture corresponding to the icon rearrangement command in step S502. If the input touch gesture is not identical to the touch gesture corresponding to the icon rearrangement command, the function corresponding to the input touch gesture is carried out in step S503.

If the input touch gesture corresponds to the icon rearrangement command, the touchscreen is folded as shown in any one of FIGS. 6A to 6D, and icons of at least one icon group displayed on the touchscreen in response to the folded touchscreen move downward for icon rearrangement in step S504. In this case, icons to be rearranged in response to a folded position of the touchscreen may also be changed. For example, assuming that the touchscreen is folded at a position between the second icon group 202 an the third icon group 203 as shown in FIG. 6C, positions of icons of the second to fifth icon groups 202 to 205 are rearranged. In accordance with another embodiment, if the user inputs a touch gesture corresponding to the icon rearrangement command under the condition that the touchscreen is folded as shown in any one of FIGS. 6A to 6D, the touchscreen is folded once more and at the same time icons of at least one icon group displayed on the touchscreen are rearranged in response to the folded touchscreen.

In this case, if the user touches a specific icon on the folded touchscreen in step S505, the function corresponding to the touched icon is carried out in step S506. Upon completion of the corresponding function in step S506, the folded touchscreen and the rearranged icons are restored to original states in step S507.

On the other hand, if the user inputs a touch gesture corresponding to the icon rearrangement release command in step S508 under the condition that a specific icon was not touched in step S505, the folded touchscreen and the rearranged icons are restored to original states in step S507.

In accordance with another embodiment, under the condition that the touchscreen is folded and icons are rearranged, if the user does not touch a specific icon and does not input a touch gesture corresponding to an icon rearrangement release command, a current state is maintained only for a predetermined time. After lapse of the predetermined time in step S509, the folded touchscreen and the rearranged icons are automatically restored to original states in step S507.

As is apparent from the above description, the portable device and a method for controlling a user interface (UI) according to the embodiments of the present disclosure can move and rearrange icons displayed on the touchscreen of the portable device within the touchscreen upon receiving a predetermined touch gesture input from the user, such that the user can control the portable device with only one hand. Specifically, if the user inputs a touch gesture corresponding to the icon rearrangement command using his or her finger, the touchscreen including icons are folded horizontally and at the same time icons move downward on the touchscreen for icon rearrangement, resulting in implementation of one-handed control of the portable device.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A portable device comprising:
a display unit including a touchscreen configured to display icons of a plurality of icon groups;
a sensing unit configured to sense a gesture input by a user; and
a controller, if the sensed gesture is a gesture corresponding to an icon rearrangement command, configured to control the display unit to change a part of the touchscreen into a folded shape and move positions of icons of at least two icon groups of the plurality of icon groups downward, thereby rearranging the icons on the touchscreen,
wherein the touchscreen, where the icons of the at least two icon groups are rearranged, is classified into a first region and a second region,
wherein a size of each icon contained in the first region is smaller than a size of each icon contained in the second region,
wherein the number of icons displayed on the touchscreen before the icon rearrangement is identical to the number of icons displayed on the touchscreen after the icon rearrangement, and
wherein, when one of icons displayed on the touchscreen after the icons rearrangement is selected by the user and a function associated with the selected icon is performed, the controller controls the display unit to restore the folded touchscreen and the moved icons to their original states.

2. The portable device according to claim 1, wherein the display unit provides a user interface for enabling the touchscreen to be folded at a position between the at least two icon groups, and moves positions of icons of two or more icon groups among the plurality of icon groups downward in response to a folded touchscreen shape, thereby rearranging the icons on the touchscreen.

3. The portable device according to claim 2, wherein a movement distance of the icons of the at least two or more icon groups is changed in proportion to at least one of a reduced length caused by a folded state of the touchscreen and a folded angle of the touchscreen.

4. The portable device according to claim 2, wherein the first region includes a folded region of the touchscreen, and the second region includes an unfolded region of the touchscreen.

5. The portable device according to claim 1, wherein the controller measures a variation in height of the user finger that has been used for the gesture such that the controller determines whether the sensed gesture is a gesture corresponding to the icon rearrangement command.

6. The portable device according to claim 5, wherein the controller, if the user finger that has been used for the gesture exceeds a predetermined reference line on the touchscreen, finally determines the sensed gesture to be a gesture corresponding to an icon rearrangement command.

7. The portable device according to claim 1, wherein the controller measures a variation in shape of the user finger that has been used for the gesture such that the controller determines whether the sensed gesture is a gesture corresponding to the icon rearrangement command.

8. The portable device according to claim 7, wherein the controller, if the user finger that has been used for the gesture exceeds a predetermined reference line on the touchscreen, finally determines the sensed gesture to be a gesture corresponding to an icon rearrangement command.

9. The portable device according to claim 1, wherein:
if the user grasping the portable device with one hand inputs a gesture corresponding to the icon rearrangement command using a finger of the hand, the controller finally determines the sensed gesture to be a gesture corresponding to the icon rearrangement command.

10. The portable device according to claim 2, wherein:
if the sensed gesture is a gesture corresponding to an icon rearrangement release command, the controller controls the display unit to restore the folded touchscreen and the rearranged icons to their original states.

11. The portable device according to claim 2, wherein:
if a gesture sensed at the folded touchscreen is a gesture corresponding to an icon rearrangement command, the controller controls the display unit to provide a user interface (UI) for enabling the touchscreen to be folded at a position between two different icon groups among the plurality of ion groups, and to move positions of icons of two or more icon groups among the plurality of icon groups downward in response to a folded touchscreen shape, thereby rearranging the icons on the touchscreen.

12. The portable device according to claim 1, wherein the display unit provides a user interface for allowing the at least one icon group to be faded away from the touchscreen, moves positions of icons of one or more icon groups among the plurality of icon groups downward in response to a faded touchscreen shape, thereby rearranging the icons on the touchscreen.

13. The portable device according to claim 1, wherein the icons displayed at one row of the touchscreen are grouped into one icon group.

14. A method for controlling a user interface of a portable device to rearrange a position of at least one icon on a touchscreen displaying icons of a plurality of icon groups, the method comprising:
sensing a gesture input by a user; and
if the sensed gesture is a gesture corresponding to an icon rearrangement command, changing a part of the touchscreen into a folded shape and moving positions of icons of at least two icon groups among the plurality of icon groups downward, and rearranging the icons on the touchscreen,
wherein the touchscreen, where the icons of the at least two icon groups are rearranged, is classified into a first region and a second region,
wherein a size of each icon contained in the first region is smaller than a size of each icon contained in the second region,
wherein the number of icons displayed on the touchscreen before the icon rearrangement is identical to the number of icons displayed on the touchscreen after the icon rearrangement, and
wherein, when one of icons displayed on the touchscreen after the icons rearrangement is selected by the user and a function associated with the selected icon is performed, the controller controls the display unit to restore the folded touchscreen and the moved icons to their original states.

15. The method according to claim 14, wherein the rearranging of the icons includes:
providing a user interface for enabling the touchscreen to be folded at a position between the at least two icon groups; and
moving positions of icons of two or more icon groups among the plurality of icon groups downward in response to a folded touchscreen shape, thereby rearranging the icons on the touchscreen.

16. The method according to claim 15, wherein the rearranging of the icons includes:
enabling a movement distance of the icons of the at least two or more icon groups to be changed in proportion to at least one of a reduced length caused by a folded state of the touchscreen and a folded angle of the touchscreen.

17. The method according to claim 15, wherein the first region includes a folded region of the touchscreen, and the second region includes an unfolded region of the touchscreen.

18. The method according to claim 14, wherein the rearranging of the icons includes:
measuring a variation in height of a user finger that has been used for the gesture, thereby determining whether the sensed gesture is a gesture corresponding to the icon rearrangement command.

19. The method according to claim 18, wherein the rearranging of the icons includes:
determining whether the user finger that has been used for the gesture exceeds a predetermined reference line on the touchscreen; and
if the user finger exceeds the reference line, finally determining the sensed gesture to be a gesture corresponding to an icon rearrangement command.

20. The method according to claim 14, wherein the rearranging of the icons includes:
measuring a variation in shape of a user finger that has been used for the gesture, thereby determining whether the sensed gesture is a gesture corresponding to the icon rearrangement command.

21. The method according to claim 20, wherein the rearranging of the icons includes:
determining whether the user finger that has been used for the gesture exceeds a predetermined reference line on the touchscreen; and
if the user finger exceeds the reference line, finally determining the sensed gesture to be a gesture corresponding to an icon rearrangement command.

22. The method according to claim 14, wherein the rearranging of the icons includes:
determining if the user grasping the portable device with one hand inputs a gesture corresponding to the icon rearrangement command using a finger of the hand; and
if the user grasping the portable device with one hand inputs a gesture corresponding to the icon rearrangement command with a finger of the hand, finally determining the sensed gesture to be a gesture corresponding to the icon rearrangement command.

23. The method according to claim 15, wherein the arranging of the icons includes:
if the sensed gesture is a gesture corresponding to an icon rearrangement release command, restoring the folded touchscreen and the rearranged icons to their original states.

24. The method according to claim 15, wherein the rearranging of the icons includes:
if a gesture sensed at the folded touchscreen is a gesture corresponding to an icon rearrangement command, providing a user interface (UI) for enabling the touchscreen to be folded at a position between two different icon groups among the plurality of ion groups; and
allowing positions of icons of two or more icon groups among the plurality of icon groups to move downward in response to a folded touchscreen shape, thereby rearranging the icons on the touchscreen.

25. The method according to claim 14, wherein the rearranging of the icons includes:
providing a user interface for enabling the at least one icon group to be faded away from the touchscreen; and
moving positions of icons of one or more icon groups among the plurality of icon groups downward in response to a faded touchscreen shape, thereby rearranging the icons on the touchscreen.

26. The method according to claim 14, wherein the icons displayed at one row of the touchscreen are grouped into one icon group.

* * * * *